(12) United States Patent
Boni et al.

(10) Patent No.: US 11,935,699 B2
(45) Date of Patent: Mar. 19, 2024

(54) OVERMOLDED FILM CAPACITOR

(71) Applicant: KEMET Electronics Corporation, Fort Lauderdale, FL (US)

(72) Inventors: Evangelista Boni, Sasso Marconi (IT); Federico Fantini, Sasso Marcono (IT); Gabriele Piccinini, Sasso Marcono (IT); Walter Bruno, Sasso Marcono (IT)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

(21) Appl. No.: 17/709,547

(22) Filed: Mar. 31, 2022

(65) Prior Publication Data

US 2022/0328246 A1 Oct. 13, 2022

Related U.S. Application Data

(60) Provisional application No. 63/171,730, filed on Apr. 7, 2021.

(51) Int. Cl.
| | |
|---|---|
| *H01G 4/224* | (2006.01) |
| *H01G 2/10* | (2006.01) |
| *H01G 4/32* | (2006.01) |

(52) U.S. Cl.
CPC .............. *H01G 4/224* (2013.01); *H01G 2/10* (2013.01); *H01G 4/32* (2013.01)

(58) Field of Classification Search
None
See application file for complete search history.

(56) References Cited

U.S. PATENT DOCUMENTS

| | | |
|---|---|---|
| 9,127,153 B2 | 9/2015 | Cain et al. |
| 2011/0107835 A1* | 5/2011 | Campbell ............... H05K 3/284 |
| | | 264/296 |

FOREIGN PATENT DOCUMENTS

| | | | | |
|---|---|---|---|---|
| EP | 2387051 A1 * | 11/2011 | ............... | H01G 2/10 |
| JP | 2016210957 A * | 12/2016 | | |
| WO | WO 00/70569 | 11/2000 | | |

OTHER PUBLICATIONS

IPEA/US; International Preliminary Report on Patentability prepared for PCT/US2022/022723; dated May 23, 2023.

* cited by examiner

*Primary Examiner* — Eric W Thomas
(74) *Attorney, Agent, or Firm* — Joseph T. Guy; Patent Filing Specialist Inc.

(57) ABSTRACT

Provided is a method for forming an overmolded film capacitor. The method includes forming a working element comprising a first film layer with a first conductive layer on the first film layer and a second film layer with a second conductive layer on the second film layer wherein the first conductive layer and second conductive layer form a capacitive couple. A first lead is formed and is in electrical contact with the first conductive layer. A second lead is formed and is in electrical contact with the second conductive layer. An overmold is formed on the working element wherein the overmold comprises a thermoplastic resin.

69 Claims, 21 Drawing Sheets

OVERMOLDED FILM CAPACITOR

CROSS-REFERENCE TO RELATED APPLICATIONS

The present application claims priority to U.S. Provisional Patent Application No. 63/171,730 filed Apr. 7, 2021 which is incorporated herein by reference.

FIELD OF THE INVENTION

The present invention is related to an improved film capacitor and more specifically to a film capacitor with an improved overmolding wherein the improved overmolding provides advantages in volumetric efficiency, manufacturing efficiency and product performance.

BACKGROUND

There is an ongoing need in the art of electronics to provide more functionality in less space. This effort, generally referred to as miniaturization, has impacted every aspect of electronic circuit and electronic device design. For the purposes of the present invention the focus is on miniaturization at the electronic component level and particularly, miniaturization of film based electronic capacitors. Electronic components are combined, typically on a substrate, to form an electronic circuit which is a critical element of an electronic device. The electronic device is typically that which the ultimate consumer has the most interest in.

A parallel effort in the art of electronics has been the drive towards electronic circuits and electronic components with higher capability and longer life expectancy. An important element of longer life expectancy is the packaging wherein the packaging protects certain portions of the electronic device as a whole, the electronic circuit as a unit or the electronic component. The present invention is particularly focused on increasing the life expectancy of an electronic component and, more specifically, film based electronic capacitors.

It is well known to those of skill in the art that miniaturization and packaging are contradictory. Packaging typically provides no advantages, with regards to electrical functionality, yet necessarily adds volume to the electronic component or electronic circuit. Packaging can also be detrimental to electrical performance in some instances. The present invention provides an overmolding which provides spatial advantages and which does not hinder electrical performance.

Coating has been done in the past, however, with film based capacitors the ability to form a coating has been limited due to the thermal characteristics of a film capacitor. It has been considered necessary to utilize resins, typically encased in some form of a box, wherein the box is filled with the resin. The box consumes valuable space. Therefore, film capacitors have not been acceptable in many applications.

There have been methods for providing a coating on an electronic component yet none have proven satisfactory for film capacitors. Forming a coating by dipping of an electronic component is suitable in some instances, however, there is limited ability to control the shape of the coating, the protection afforded is determined by the coating characteristics of the material and it is very difficult to combine multiple components in a common coating.

Boxes filled with epoxy resins are commonly employed, however, the aforementioned miniaturization is compromised. Similarly the use of a box without resin is employed in some instances but the environmental protection provided is insufficient.

The present invention provides an overmolding, and method of forming an overmolding, suitable for use with film capacitors wherein the overmolding comprises a direct mold without the use of an external box.

SUMMARY OF THE INVENTION

The present invention provides an improved overmolding particularly for a film capacitor.

A particular advantage is a reduction in the amount of volume required relative to a coated film capacitor or a film capacitor contained in a box.

Another particular advantage is an overmolded film capacitor which does not hinder or degrade electrical performance and which increases the useful life span of a film capacitor.

These and other advantages, as will be realized, are provided in a method for forming an overmolded film capacitor comprising:
forming a working element comprising a first film layer with a first conductive layer on the first film layer and a second film layer with a second conductive layer on the second film layer wherein the first conductive layer and second conductive layer form a capacitive couple;
forming a first lead in electrical contact with the first conductive layer and a second lead in electrical contact with the second conductive layer; and
forming an overmold on the working element wherein the overmold comprises a thermoplastic resin with a Tg of no more than 20° C. and wherein the first lead and second lead extend from the overmolding.

Yet another embodiment is provided in a method for forming an overmolded film capacitor comprising:
forming a working element comprising a first film layer with a first conductive layer on the first film layer and a second film layer with a second conductive layer on the second film layer wherein the first conductive layer and second conductive layer form a capacitive couple;
forming a first lead in electrical contact with the first conductive layer and a second lead in electrical contact with the second conductive layer; and
forming an overmold on the working element wherein the overmold comprises a thermoplastic resin with a Youngs Modulus of 0.1-5 GPa and wherein the first lead and second lead extend from the overmolding.

Yet another embodiment is provided in a method for forming an overmolded film capacitor comprising:
forming a working element comprising a first film layer with a first conductive layer on the first film layer and a second film layer with a second conductive layer on the second film layer wherein the first conductive layer and second conductive layer form a capacitive couple;
forming a first lead in electrical contact with the first conductive layer and a second lead in electrical contact with the second conductive layer;
forming an overmold on the working element at a pressure of 300-2200 bar and a temperature of at least 245° C. wherein the overmold comprises a thermoplastic resin; and wherein the first lead and second lead extend from the overmolding.

Yet another embodiment is provided in an overmolded film capacitor. The film capacitor comprises at least one working element comprising a dielectric film with a conductor formed on the dielectric film. An overmold encases the working element wherein the overmold comprises a thermoplastic resin directly on the working element and the overmold does not comprise a resin filled box.

DESCRIPTION

The present invention is related to an overmolded film capacitor wherein the overmold comprises plastics, preferably thermoplastic resin, and the finished overmolded film capacitor does not have a box, such as a resin filled box, as typically required with overmolded film capacitors. More specifically, the present invention is related to an overmold which is formed directly on the working element of the film capacitor without the necessity of a box to contain the molding materials as typically required in the art of film capacitors.

A particular advantage is provided by the use of High-Pressure Injection (HPI) molding with a thermoplastic as, at least, an inner overmold directly on the film capacitor. Particularly preferred are thermoplastic resins with a melting temperature, $T_M$, of about 160° C.-350° C., a glass transition temperature, $T_g$, of no more than 20° C. or a Young's Modulus of 0.1 to 5 GPa. Polypropylene (PP), polyphenylene sulfide (PPS) and polybutylene terephthalate (PBT) are particularly well suited for use with PP being particularly preferred.

To get the mechanical and electrical performance in high temperature and humidity environments it is necessary that the overmold layer be homogeneous which is achieved by the present invention using the stated thermoplastic resin and high pressure injection molding.

High pressure molding is well known in the art for various applications. High pressure molding is typically done at molding temperatures which are above the $T_g$ of the thermoplastic resin used and preferably from about 200° C. to 350° C. By way of examples it is preferable that the molding temperature be about 200 to 240° C. for PP and PBT and about above 250° C. to 320° C. at pressures of 300-1000 bar for PPS.

The invention will be described with reference to the figures which are integral, but non-limiting, part of the specification provided for clarity of the invention. Throughout the various figures similar elements will be number accordingly.

Figure 1:
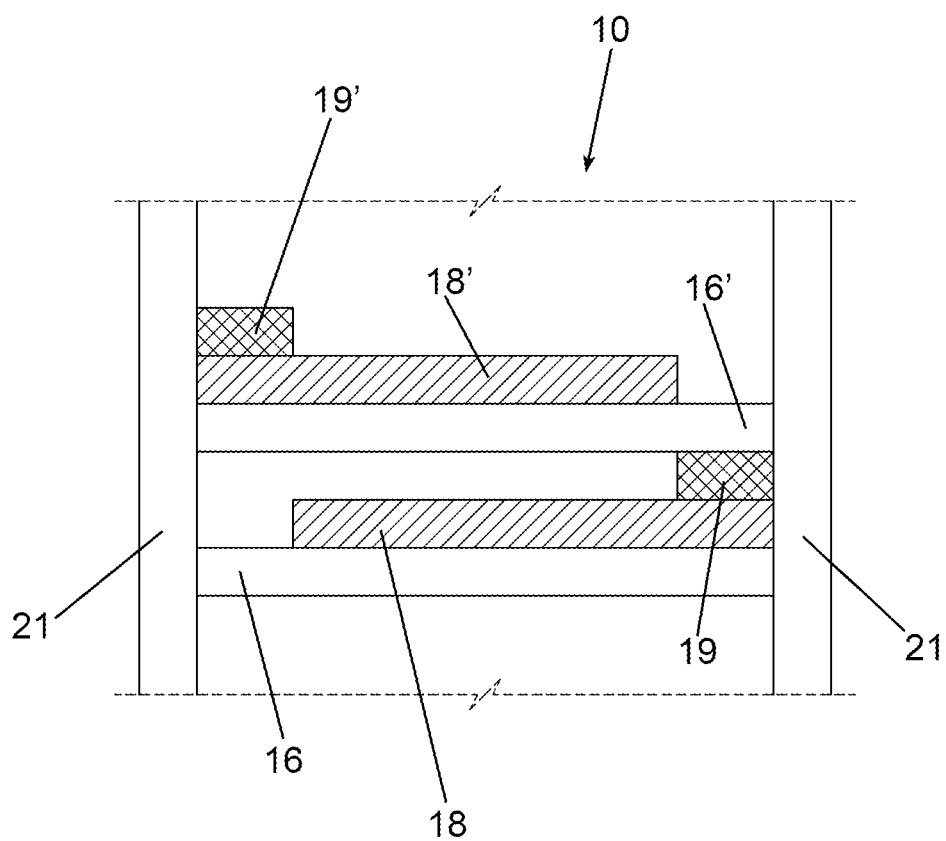
FIG. 1 is a cross-sectional schematic view of a working element of a film capacitor.

An embodiment of the invention will be described with reference to FIG. 1 wherein a working element is shown in schematic layered view with two layers being shown without limit thereto. In FIG. 1, the working element, generally represented at 10, comprises a first film layer, 16, with a first conductive layer, 18, coated on one side. A second film layer, 16', with a second conductive layer, 18', coated on one side is in a layered arrangement with the first film layer. As would be realized, adjacent metal layers of opposite polarity are separated by film layers. For the purposes of discussion, the first conductive layer is designated the anode and the second conductive layer is designated the cathode without limit thereto. Each first conductive layer is physically and electrically separated from the adjacent second conductive layer by a film layer wherein the film layer functions as a dielectric film between the first conductive layer and second conductive layer. The first film layer and conductive coating and second film layer and conductive coating are preferably identical, for manufacturing conveniences, or they may be different to allow for flexibility in manufacturing or design. Conductive pads, 19, are optionally and preferably formed on the conductive layer thereby allowing for the electrical attachment of leads, 21, wherein the first conductive layer, and those layers with the same polarity, are electrically attached to a first lead and the second conductive layer, and those layers with the same polarity, are attached to a second lead as known in the art. Adjacent conductive layers are offset to allow for conductivity to a lead and to insure adjacent conductive layers are not commonly terminated as would be readily understood by those of skill in the art.

Figure 2:
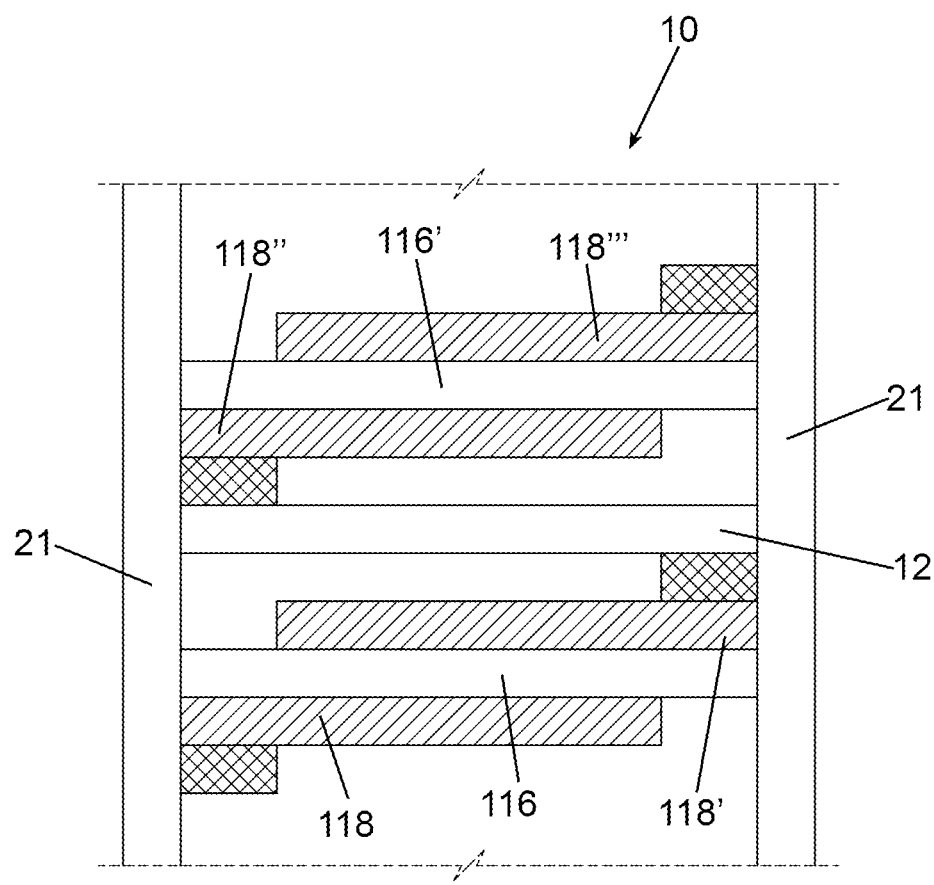
FIG. 2 is a cross-sectional schematic view of a working element of a film capacitor.

An embodiment of the invention will be described with reference to FIG. 2 wherein a working element is shown in schematic layered view. In FIG. 2, the working element, generally represented at 10, comprises a first film layer, 116, with a first conductive layer, 118, coated on a first side and a second conductive layer, 118', coated on a second side preferably with an offset to allow for termination of adjacent conductors to leads of opposite polarity as would be realized to those of skill in the art. The first film layer is in a layered arrangement with a second film layer, 116'. A separator, 12, which is preferably a film without any conductive coating, is sandwiched between the first film layer and second film layer. More specifically, a separator would be between each film layer having a conductive layer on each side of the film layer. The capacitive couple is formed by adjacent metal layers with a film layer between each adjacent layer. For the purposes of discussion, metal layers 118 and 118" are designated as anode layers with layers 118' and 118''' designated cathode layers without limit thereto.

Figure 3:
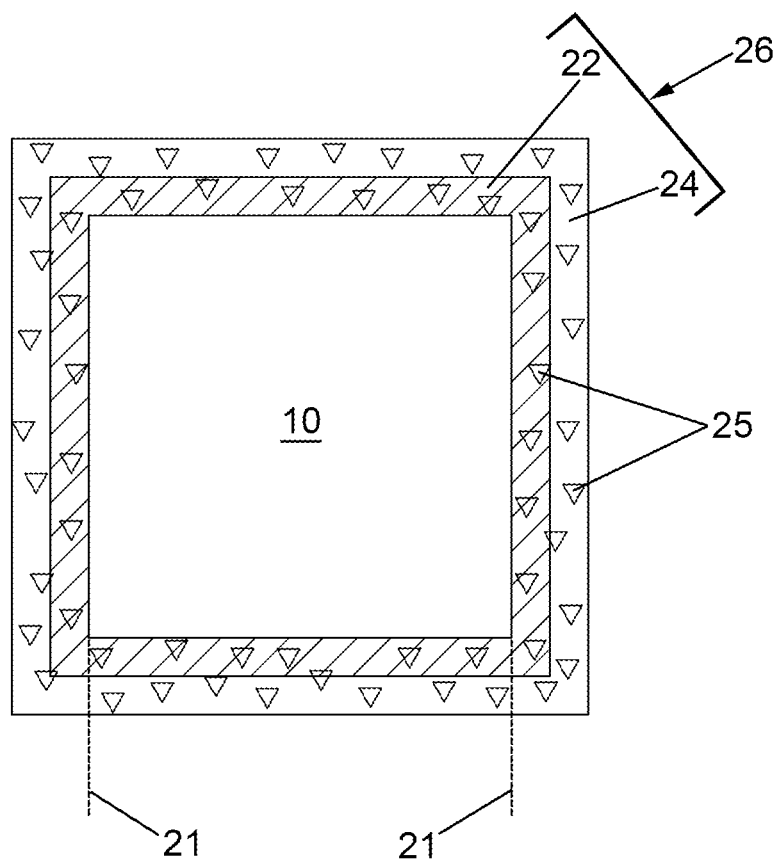
FIG. 3 is a cross-sectional schematic view of an overmolded film capacitor.

An embodiment of the invention will be described with reference to FIG. 3. In FIG. 3 an overmolded film capacitor is illustrated in cross-sectional schematic view. The working element, 10, comprising leads, 21, is encased in an overmold, 26. The overmold is the outermost layer and may comprise an inner overmold, 22, directly on and encasing the working element, and an outer overmold, 24, encasing the inner overmold. At least the inner overmold is formed by high pressure injection and preferably both the inner overmold and outer overmold are formed by high pressure injection. The overmold, 26, encases the entirety of the working element, 10, with the leads, 21, extending through the overmold. The overmold is formed in-situ on the working element and does not comprise a preformed box. Forming in-situ is defined herein as being formed from a flowing material wherein the flowing material engulfs the working element during in-situ formation. For the purposes of the instant invention an overmolded film component is a film component that has an overmold formed thereon. A phase change material (PCM), 25, is optionally and preferable in the overmold, 26, preferably in the outer overmold, 24.

The outer overmold can be formed by any thermoplastic resin which is compatible with the thermoplastic resin of the inner overmold. Preferred thermoplastic resins for use in the outer overmold include those materials selected from the group consisting of polypropylene, polybutylene, polybutylene terephthalate (PBT), polyethylene terephthalate (PET), poly-cyclic olefins, polyphenylene sulfide, acrylic acids, acrylonitrile butadiene styrene (ABS), Nylon®, polylactide (PLA), Liquid Crystal Polymers, polybenzimidazole, polycarbonate, polyether sulfone, polyoxymethylene, polyether ether ketone, polyethylene, polyetherimide, polyphenylene oxide, polystyrene, polyvinyl chloride, polyvinylidene and polytetrafluoroethylene and bio-based polymers.

Figure 4:
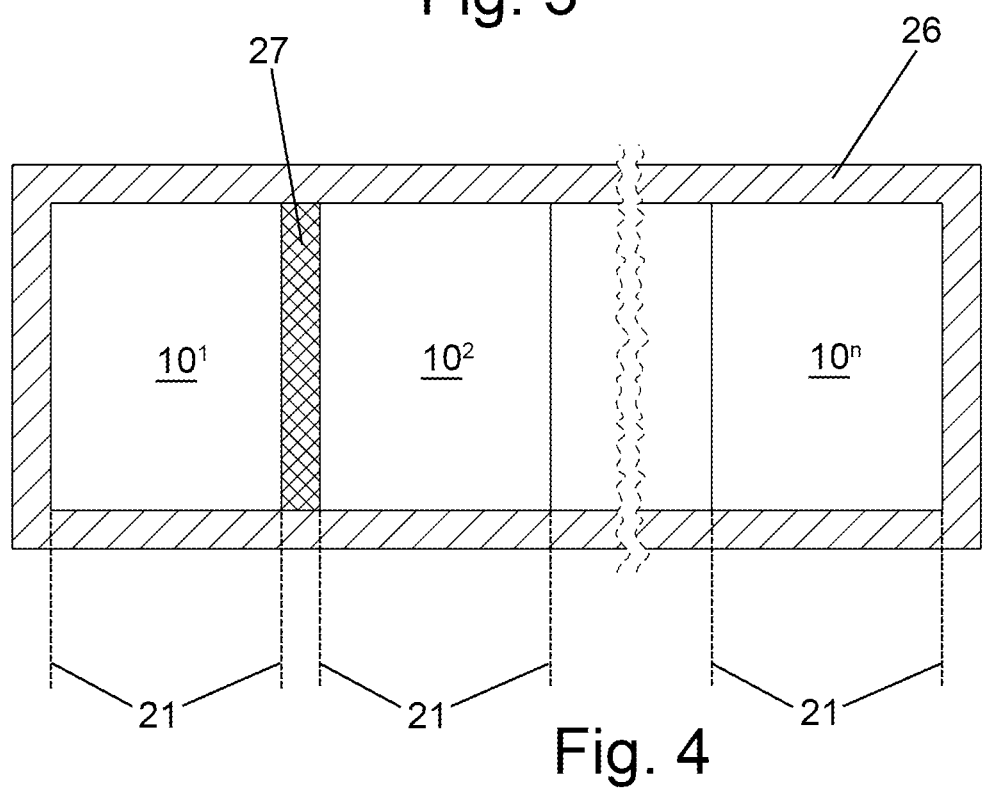
FIG. 4 is a cross-sectional schematic view of multiple film capacitors which are commonly overmolded.

FIG. 4 schematically illustrates, in cross-sectional view, a multiplicity of working elements, 10, in a common overmold, 26. An insulator, 27, is preferably between adjacent working elements wherein the insulator can be formed prior to overmolding or the insulator can be formed during overmolding wherein the insulator comprises the thermoplastic resin used for overmolding.

The cross-sectional size of the film layer is not particularly limited and chosen to meet the design limitations including capacitance as a function of available space.

Particularly preferred film layers are biaxial stretched to form a biaxially oriented film which is a well-known technique wherein a roll of film is stretched in a machine direction (MD), which is perpendicular to the width of the film, and transverse direction (TD), which is parallel to the width of the film. Machine direction and transverse direction can be done simultaneously or sequentially. In some instances, biaxial stretching is done while the film is in a partially molten state. Biaxial stretching can be accomplished by any technique known in the art such as rolling, uniaxial compression, tenter-frame stretching and the like. Biaxial stretching alters the crystallinity of the polymer thereby altering the properties relative to as-cast material. Biaxial stretched polypropylene is widely available commercially in a variety of suitable thicknesses and therefore further explanation of the process is not warranted herein. Biaxial stretched polypropylene with a thickness of less than 20 μm is preferred due to commercial availability.

Metallized films suitable for use in this invention are not particularly limited herein. In a particularly preferred embodiment the metallized films are formed as an evaporated metal coating on the surface of the dielectric film as well known to those of skill in the art. It is preferable that the metallized films comprise insulating margins on the side not being electrically connected to a conductor as known in the art. The metal is not particularly limited with aluminum and zinc being particularly suitable for demonstration of the invention.

The dielectric film is not particularly limited herein, however, plastic dielectric films are preferred. Particularly suitable films for use in demonstrating the invention include polypropylene (PP), polyethylene (PE), polyethylene terephthalate (PET), polyphenylene sulfide (PPS), tetrafluoroethylene (TFE), polystyrene (PS), polycarbonate (PC), cyclic olefin copolymer (COC), cyclo olefin polymer (COP) and combinations thereof. Fluorinated films, particularly fluorinated olefins, are particularly suitable with polyvinylidene fluoride (PVDF), and tetrafluoroethylene being exemplary. The dielectric film may comprise a composite oxide particle as a filler such as an oxide selected from the group consisting of barium titanium oxide, magnesium titanate, calcium titanate, strontium titanate and beryllium titanate. Other oxides suitable for demonstration of the invention include materials made of group 2 metallic elements from the second period to the fifth period in the periodic table specifically, barium titanium oxide, magnesium titanate, calcium titanate, and the like.

The conductors are not particularly limited herein. Conductors formed by metal deposition or from metal foils are particularly suitable for demonstration of the invention.

The lead out terminals are not particularly limited herein with any conventional lead out terminal commonly employed in the art being suitable for demonstration of the invention.

The conductive layer material is any material which can be coated onto film layers to provide a conductive coating and act as the conductor of the capacitor. Metals, carbon and combinations thereof are particularly preferred. Particularly preferred conductive coatings comprise aluminum, copper, zinc, gold, silver and combinations thereof. The conductive layer is applied by any technique known in the art such as vapor deposition, thermal evaporation, PVD, coating, spraying and the like. The conductive coating is typically applied to a thickness of at least 10 nm to no more than 500 nm.

Figure 5:
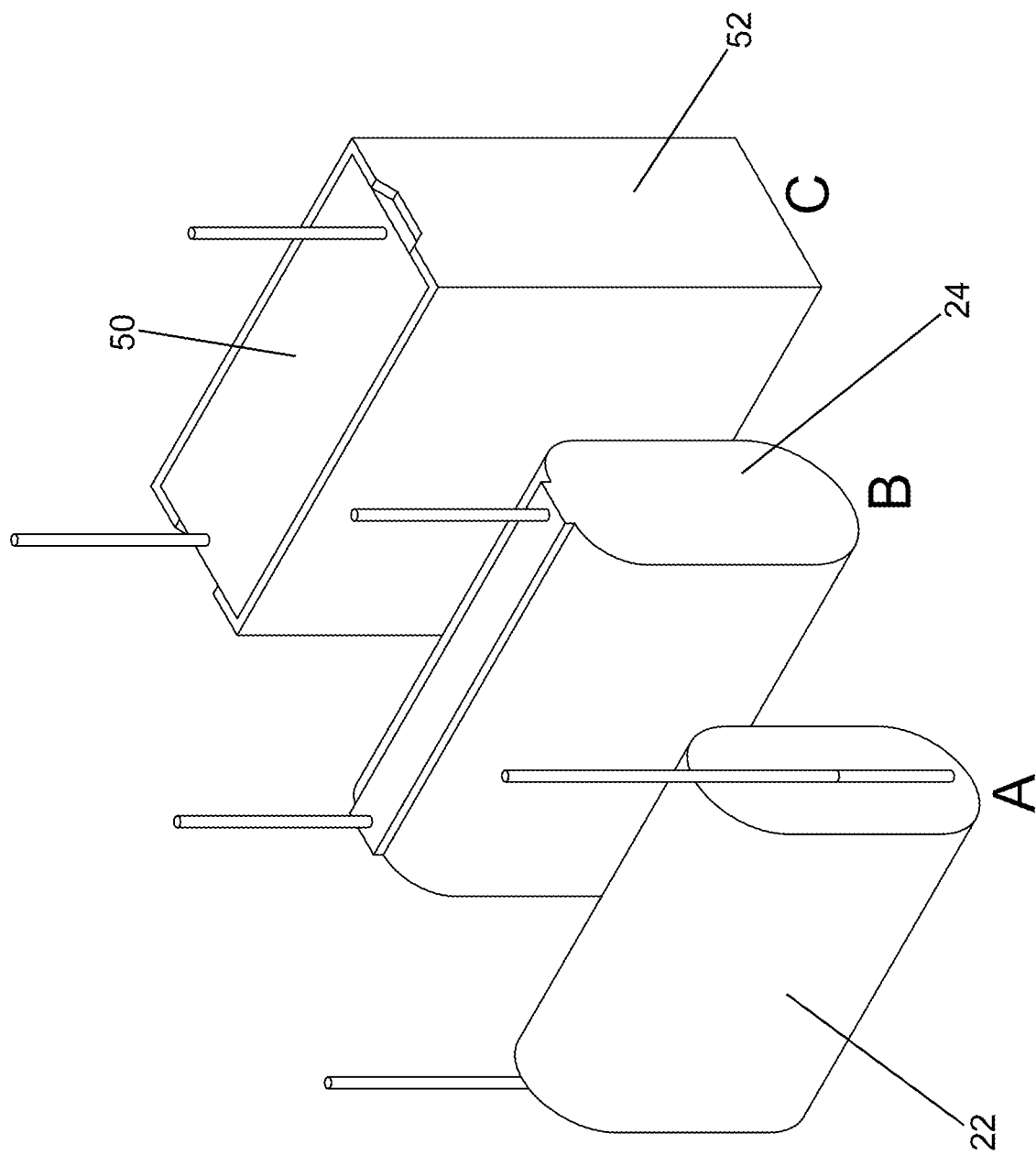
FIG. 5 is a perspective view illustrating the volumetric advantages provided by the instant invention.
Figure 6:
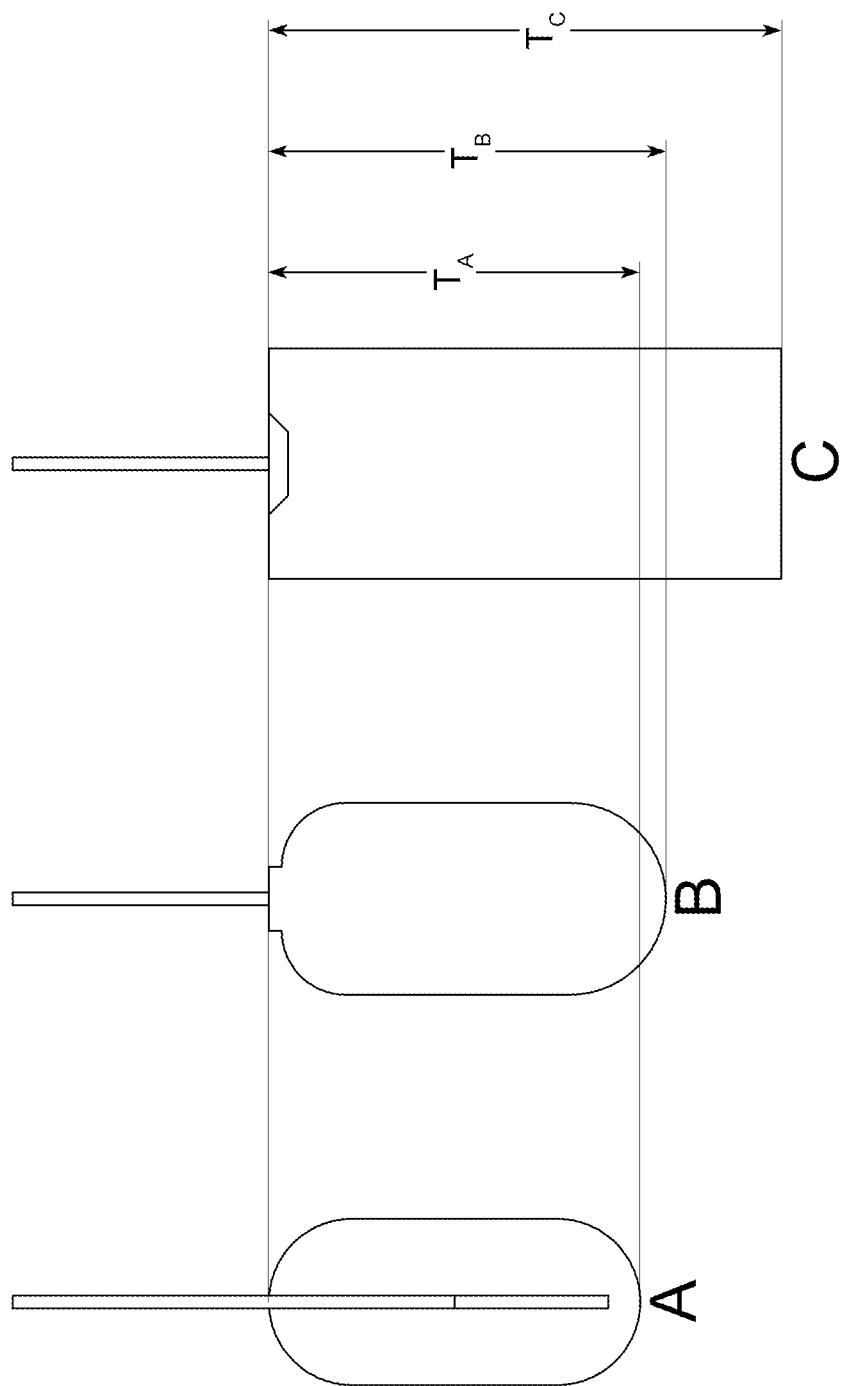
FIG. 6 is an end view illustrating the volumetric advantages provided by the instant invention.

An advantage will be described with reference to FIGS. 5 and 6 wherein identical film capacitors are overmolded or packaged by conventional methods. FIG. 5 is a perspective view and FIG. 6 is an end view. Capacitor C is a conventional packaged film capacitor using conventional resin, 50, within a box, 52. The minimum size of the packaged capacitor is limited by the size of the box and the box must necessarily be larger than the capacitor contained therein. Capacitor A is an inventive capacitor comprising a high-pressure injection overmolded film capacitor wherein the overmold, 22, is polypropylene. The thickness, TA, of the inventive film capacitor is significantly less than the thickness, Tc, of the conventional packaged film capacitor represented by Capacitor C. Capacitor B comprises an inventive first overmold, as described for Capacitor A, with an additional overmold, 24, of polyphenylene sulfide encasing the polypropylene overmold. Though the thickness of Capacitor B, TB, is slightly larger with an inner overmold and outer overmold the protection to environmental conditions is superior and the thickness is still less than the thickness of the conventional packaged capacitor represented as Tc. As would be realized the advantage in thickness illustrated for the end view would be evident in three dimensions and therefore the overall dimensions of the inventive capacitors, relative to the prior art, provides a significant advantage with regards to miniaturization.

The instant invention provides benefits beyond miniaturization and electrical performance. Elimination of the box, within which the capacitor and resin are inserted, eliminates the cost of the box and reduces the total amount of material necessary to protect a film capacitor from environmental conditions.

The instant invention also allows for significant flexibility in the shape of the overmold. The ability to shape the overmold provides many advantages. In one embodiment the shape of the overmold can conform to the shape of the film capacitor being overmolded. By conforming to the shape of the film capacitor the amount of material in the overmold can be optimized to that thickness necessary to provide environmental protection without excessive thickness in portions of the overmold thereby reducing material cost. In another embodiment the shape of the overmold can be tailored to provide pick-and-place components, stability components and the like.

A feature of the instant invention is the ability to overmold multiple components in one common molding thereby allowing for further miniaturization and flexibility.

The instant invention provides an overmold with significant aesthetic appeal. In addition to the aforementioned ability to utilize desirable shapes, those elements of a box filled resin common in the art are eliminated such as cracks in the resin or box, swollen caps, bubbles or voids in the resin, stains, etc.

A feature of the instant invention is the ability to overmold multiple components in one common molding thereby allowing for further miniaturization and flexibility. A particular feature is the ability to incorporate phase change materials in the overmold and particularly in an outer overmold.

Non-limiting examples of the phase change material may include alloys, organic phase change materials, water-based phase change materials, waxes, hydrated salt-based materials, solid-solid phase change materials, sugar alcohol based materials and solid-viscous-liquid phase change materials.

Particularly preferred phase change materials have an enthalpy for phase change in the range 0.1 kJ/kg to 4186 kJ/kg and more preferably 50 kJ/kg to 600 kJ/kg.

Particularly preferred phase change materials have has a phase change temperature of 45° C. to 300° C. and more preferably from 80° C. to 200° C.

Particularly preferred alloys for use as phase change materials include solders including InSn-based alloys, such as Indalloy 1E, which has a melting temperature of about 117° C.; InAg-based alloys, such as Indalloy 164, which has a melting temperature of about 154° C.; InPb-based alloys, such as Indalloy 204, which as a melting temperature of about 175° C.; and BiSn-based alloys, such as Indalloy 281, which has a melting temperatures of about 138° C.

Particularly preferred organic phase change materials include savE® HS89 from Pluss®, which has a melting temperature of about 89° C.; PureTemp® 151 from Pure Temp LLC, which has a melting temperature of about 151° C.; Paraffin 33-Carbon, which has a melting temperature of about 75.9° C.; PlusICE A118, which has a melting temperature of about 118° C.; and PlusICE A164, which has a melting temperature of about 164° C.

Water and water-based PCMs have a phase transition temperature of about 100° C.

Particularly preferred waxes include bees wax, carnauba wax and other paraffin waxes which are commercially available having melting points of about 50° C. to about 80° C.

Particularly preferred hydrated salt-based materials include PlusICE H120, which has a melting temperature of about 120° C.; magnesium chloride hexahydrate, which has a melting temperature of about 117° C.; and PlusICE S117 which has a melting temperature of about 117° C.

Particularly preferred solid-solid phase change materials include PlusICE X130, which has a phase transition temperature of about 130° C.; tris(hydroxymethyl)aminomethane which has a phase transition temperature of about 130° C.; and FSM-PCM95 from Forsman Scientific (Beijing) Co., Ltd., which has a phase transition temperature of about 134° C., a melting temperature of about 169° C. and an enthalpy energy of about 293 kJ/kg.

Particularly preferred solid-viscous-liquid phase change materials are based on rubber filler, such as 9005-H120 Series available from Guangdong Kingbali New Material Co. LTD, which has a phase transition temperature of about 120° C. and an enthalpy energy of about 200 kJ/kg.

A solid-solid transition PCM is particularly preferred as it allows the component to withstand multiple reflow cycles or rework cycles without loss of thermal shield performance. A solid-liquid transition PCM is also particularly preferred provided the structure maintains the liquid within the structure and does not allow the liquid to spill out of the structure.

Liquid-vapor or solid-vapor transition phase change materials are suitable for use during heat absorption in the case of one time need such as during manufacturing.

EXAMPLES

A series of identical film capacitors were prepared with a pitch, or the distance between external leads, of 5 mm. A set of individual film capacitors were packaged using a box and resin in accordance with standard practice in the art to form control capacitors. A second set of individual film capacitors were overmolded with polypropylene with high pressure injection to form inventive overmolded film capacitors. The average dimension reduction, Height×Length×Width (HLW), of the inventive overmolded film capacitors, relative to the control capacitors, was 3.2 mm×0.0 mm×1.1 mm which provides an average reduction in volume of 231.5 mm$^3$ or about 35%. The average capacity density, or capacitance as a function of volume, increased by 77.7×10$^{-3}$ nF/mm$^3$ or about 52%.

A series of identical film capacitors were prepared with a pitch, or the distance between external leads, of 27.5 mm. A set of individual film capacitors were packaged using a box and resin in accordance with standard practice in the art to form control capacitors. A second set of individual film capacitors were overmolded with polypropylene with high pressure injection to form inventive overmolded film capacitors. The average dimension reduction, HLW, of the inventive overmolded film capacitors, relative to the control capacitors, was 5.5 mm×1.7 mm×1.0 mm which was an average reduction in volume of 3631.5 mm$^3$ or about 30%. The average capacity density increased by 189×10$^{-3}$ nF/mm$^3$ or about 42%.

Another series of identical film capacitors were prepared with a pitch, or the distance between external leads, of 27.5 mm. A set of individual film capacitors were packaged using a box and resin in accordance with standard practice in the art to form control capacitors. A second set of individual film capacitors were overmolded with polypropylene with high pressure injection to form inventive overmolded film capacitors. The average volume reduction was 18% and the average increase in capacitive density, or capacitance as a function of volume, was 22%.

Figure 7:
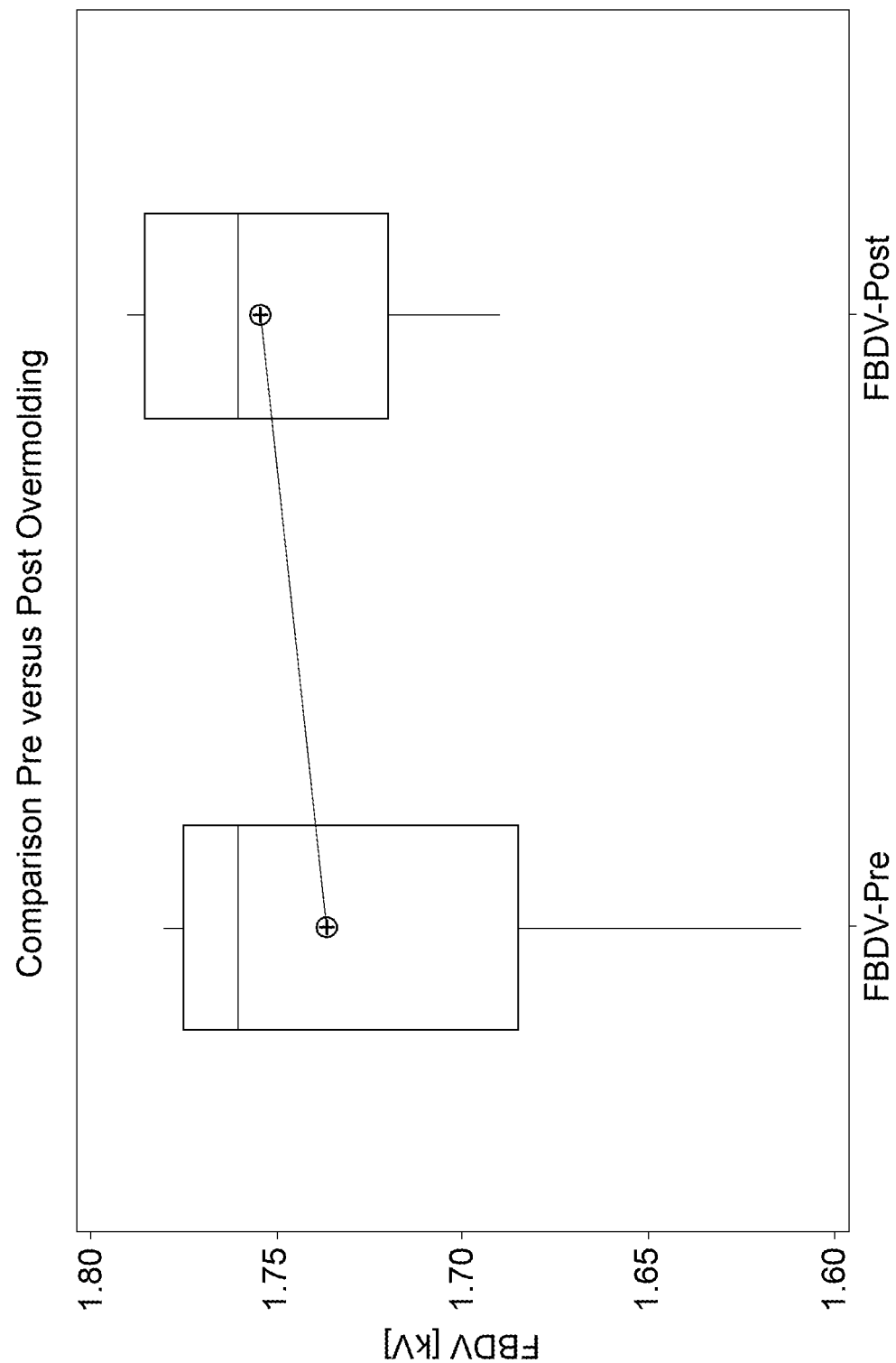
FIGS. 7-22 graphically illustrate the advantages provided by the instant invention.
Figure 8:
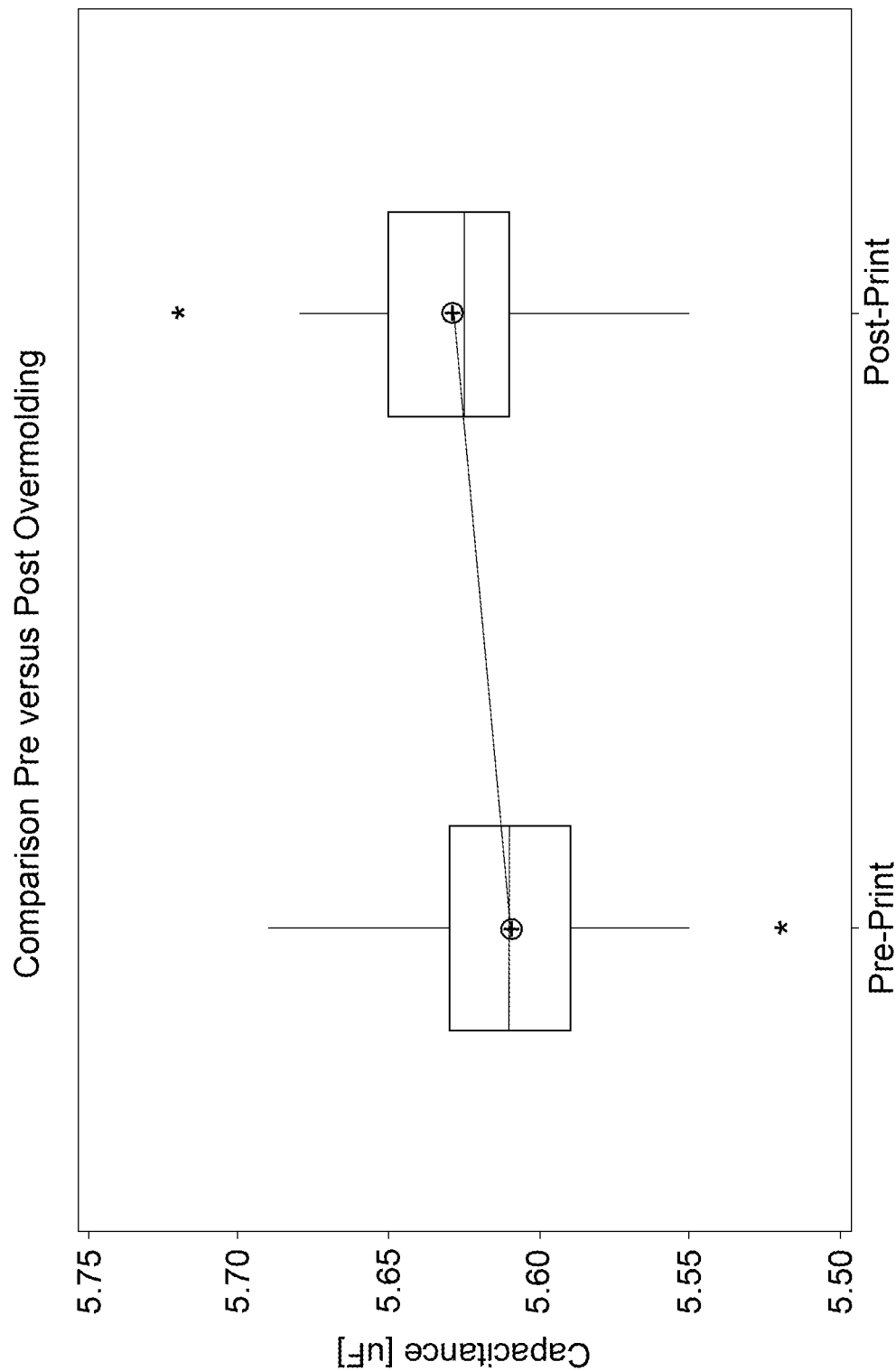
Figure 9:
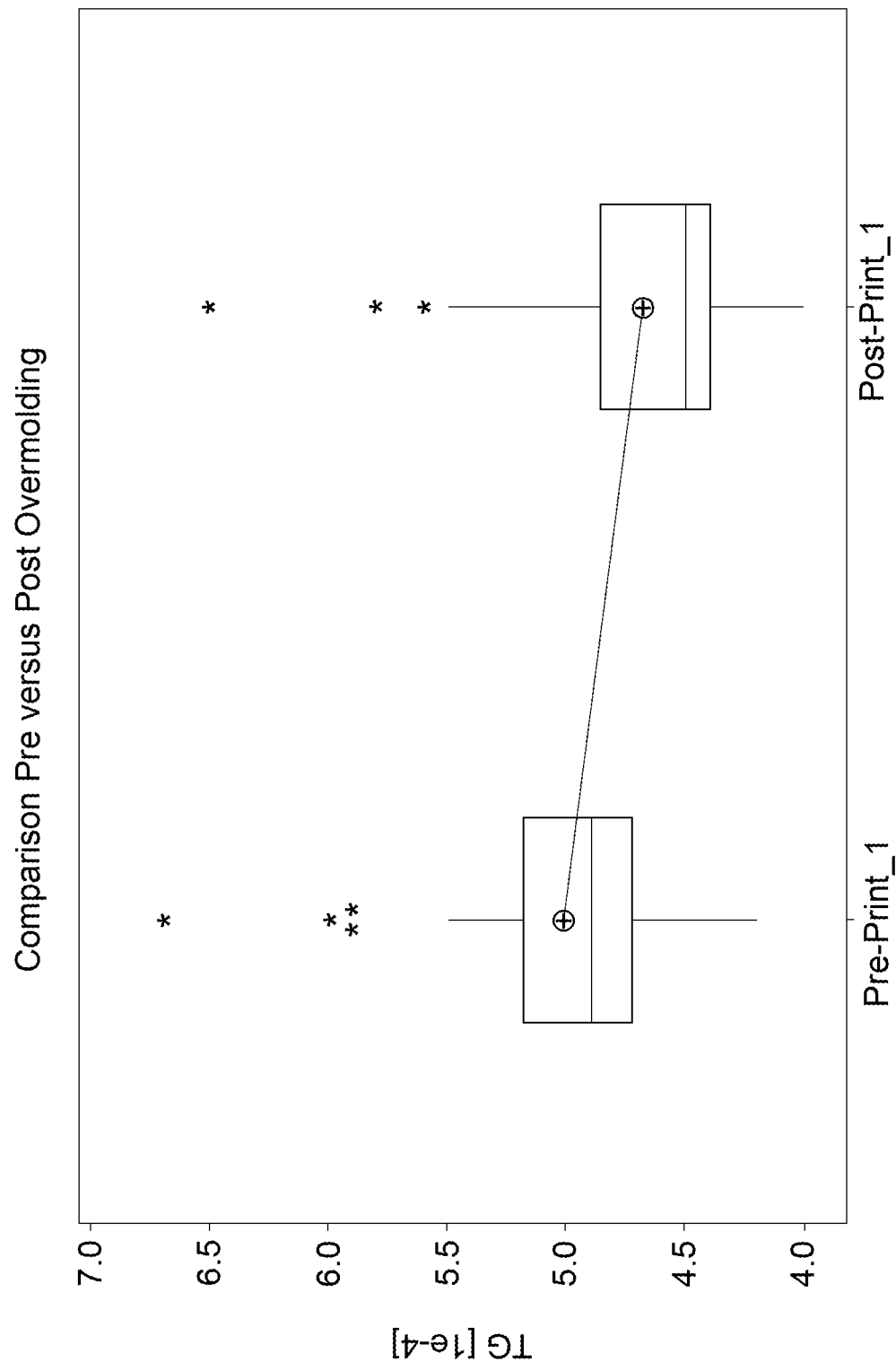
Figure 10:
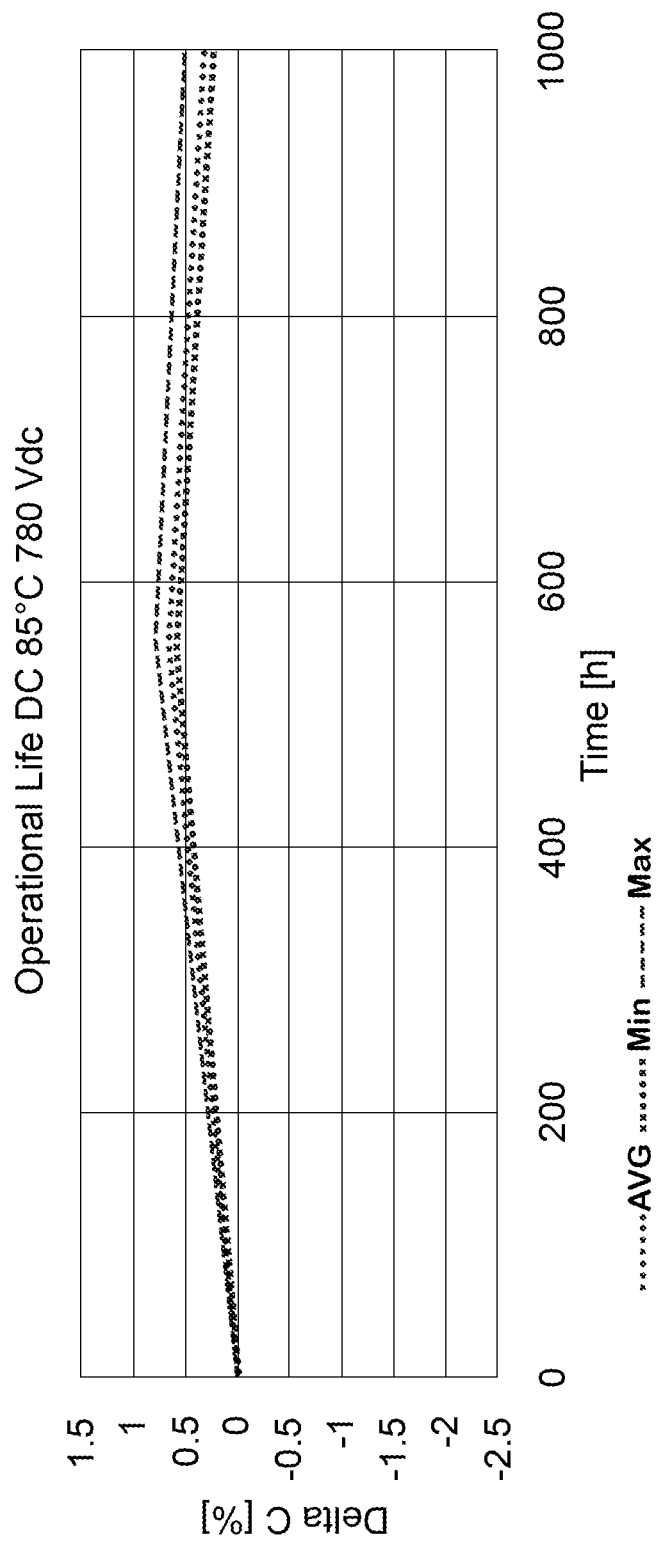
Figure 11:
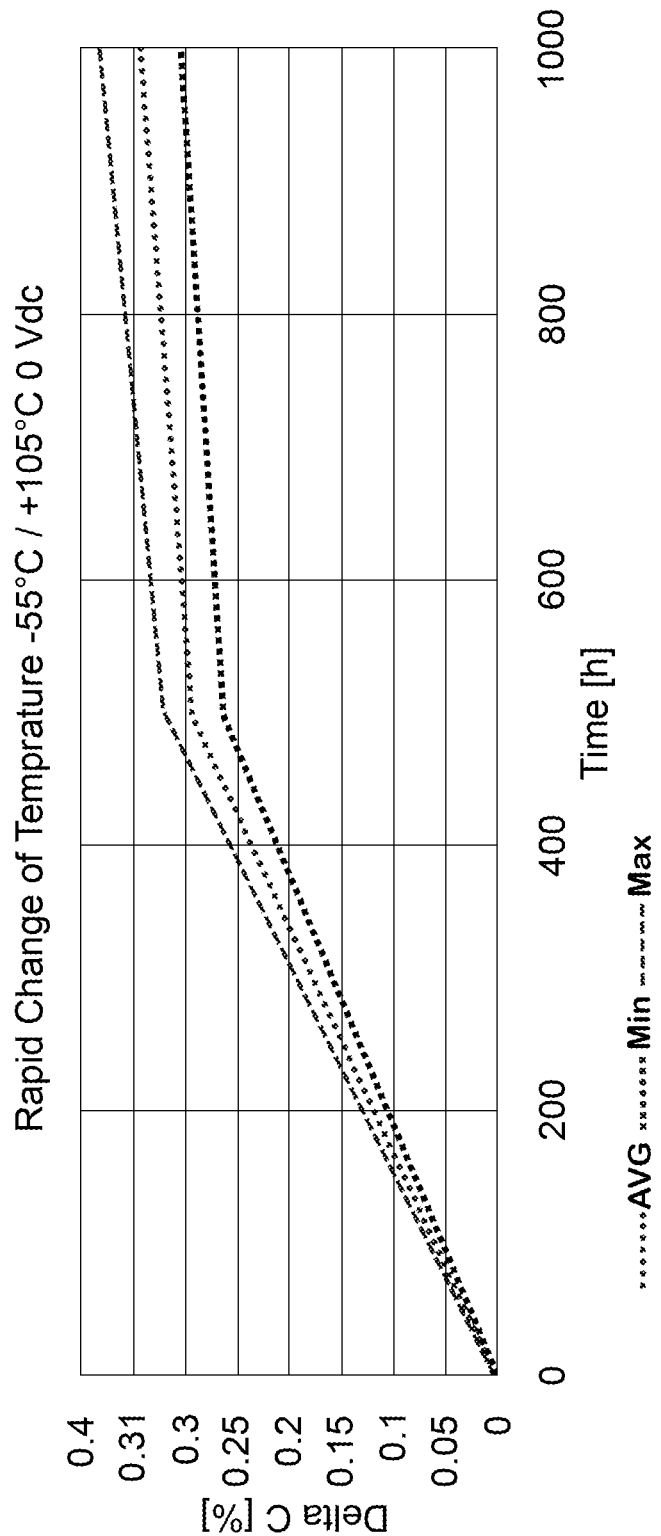
Figure 12:
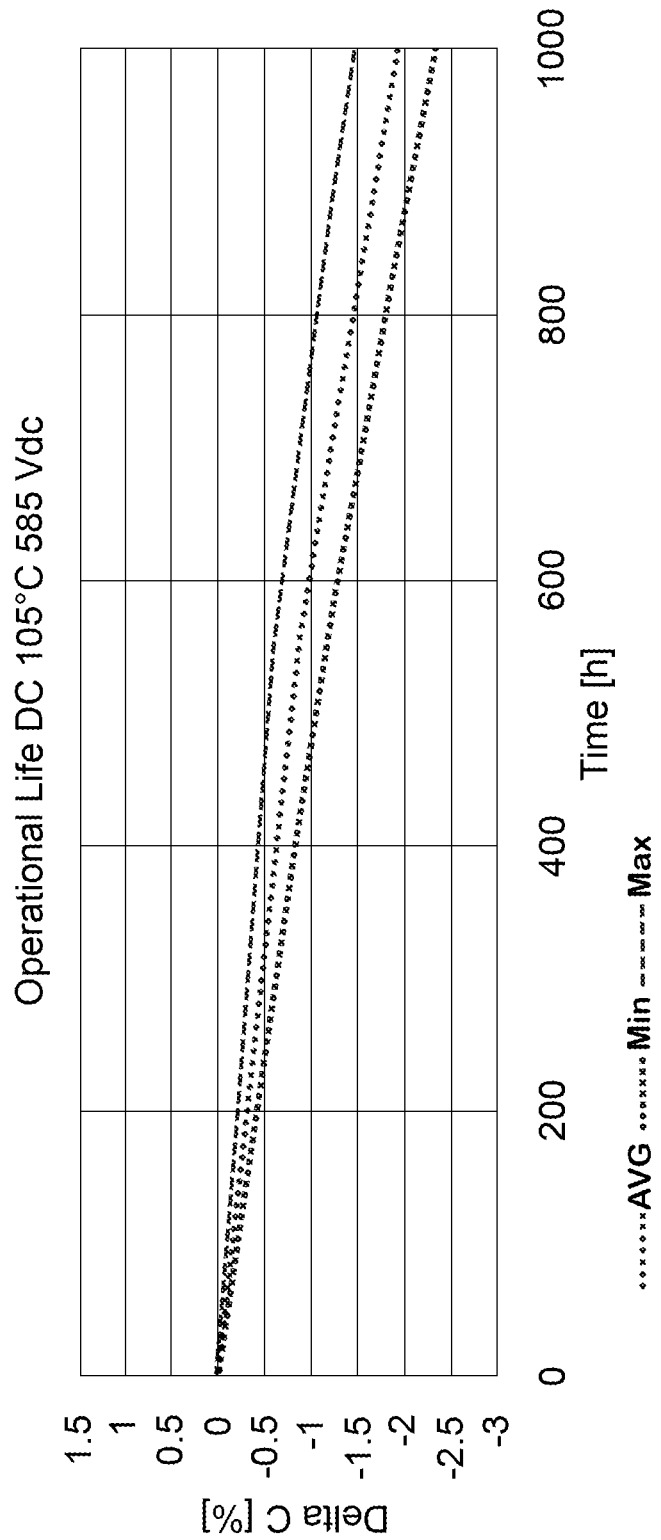
Figure 13:
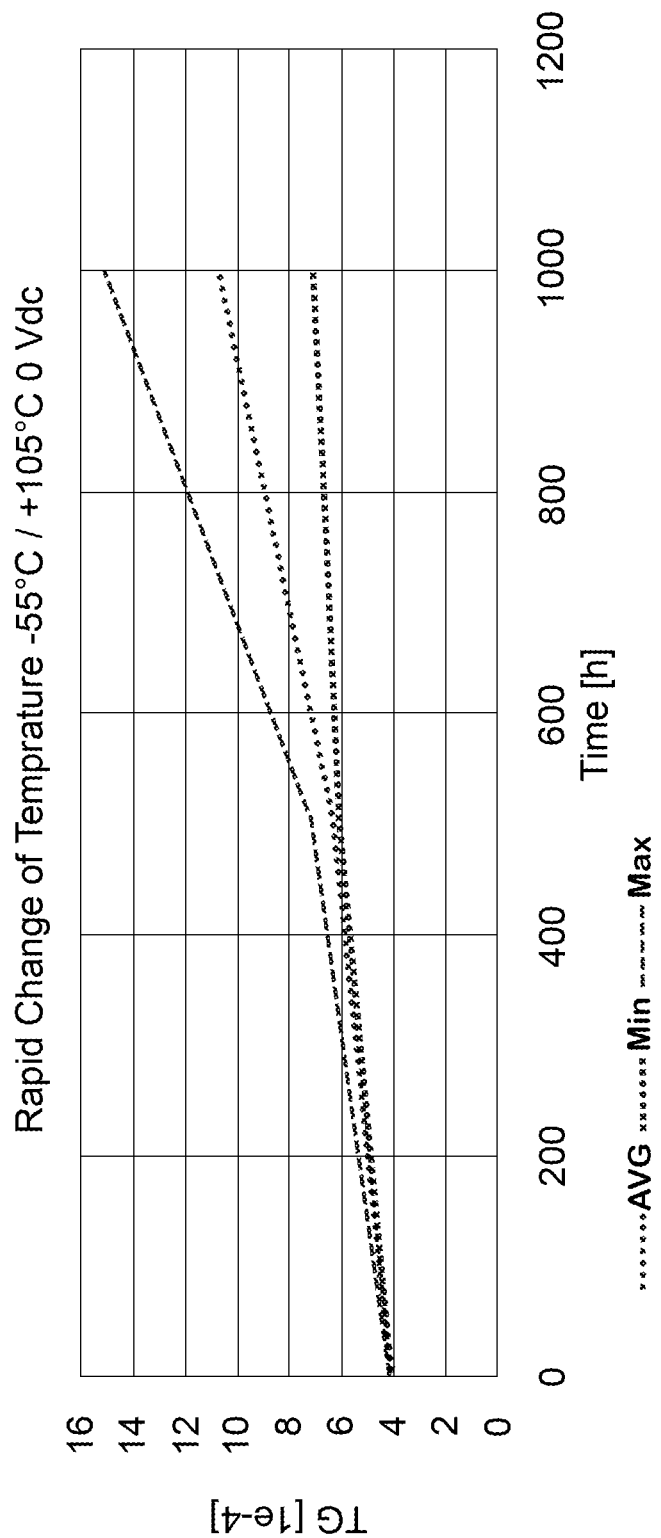

A series of identical power box film capacitors for DC-Link applications were prepared using PP base film single metallized with aluminum and zinc which were electrically connected to leads with a pitch of 27.5 mm. The capacitors were overmolded with PP resin. The film capacitors were characterized before and after the high-pressure injection overmoding. The series was tested prior to and after high-pressure injection molding with polypropylene. The high-pressure injection molding was done at a temperature of 200° C.-250° C. and a pressure of 400 bar to form a coating with a thickness of about 1 mm all around the capacitor element. All the samples were tested for breakdown voltage (FBDV) in kV with the results presented graphically in FIG. 7, capacitance in μF is presented graphically in FIG. 8 and Tgδ @ 1 kHz is presented graphically in FIG. 9. After the characterization the samples were divided in 3 groups. One group of the three was tested at 85° C. @ 780 Vdc with the results presented graphically in FIG. 10, one group was tested at 105° C. @ 585 Vdc with the reported graphically in FIG. 12 and the third group was tested for rapid change of temperature from −55+105° C. with the DF @1 kHz results reported graphically in FIG. 13 with the change percentage change presented graphically in FIG. 11.

Figure 14:
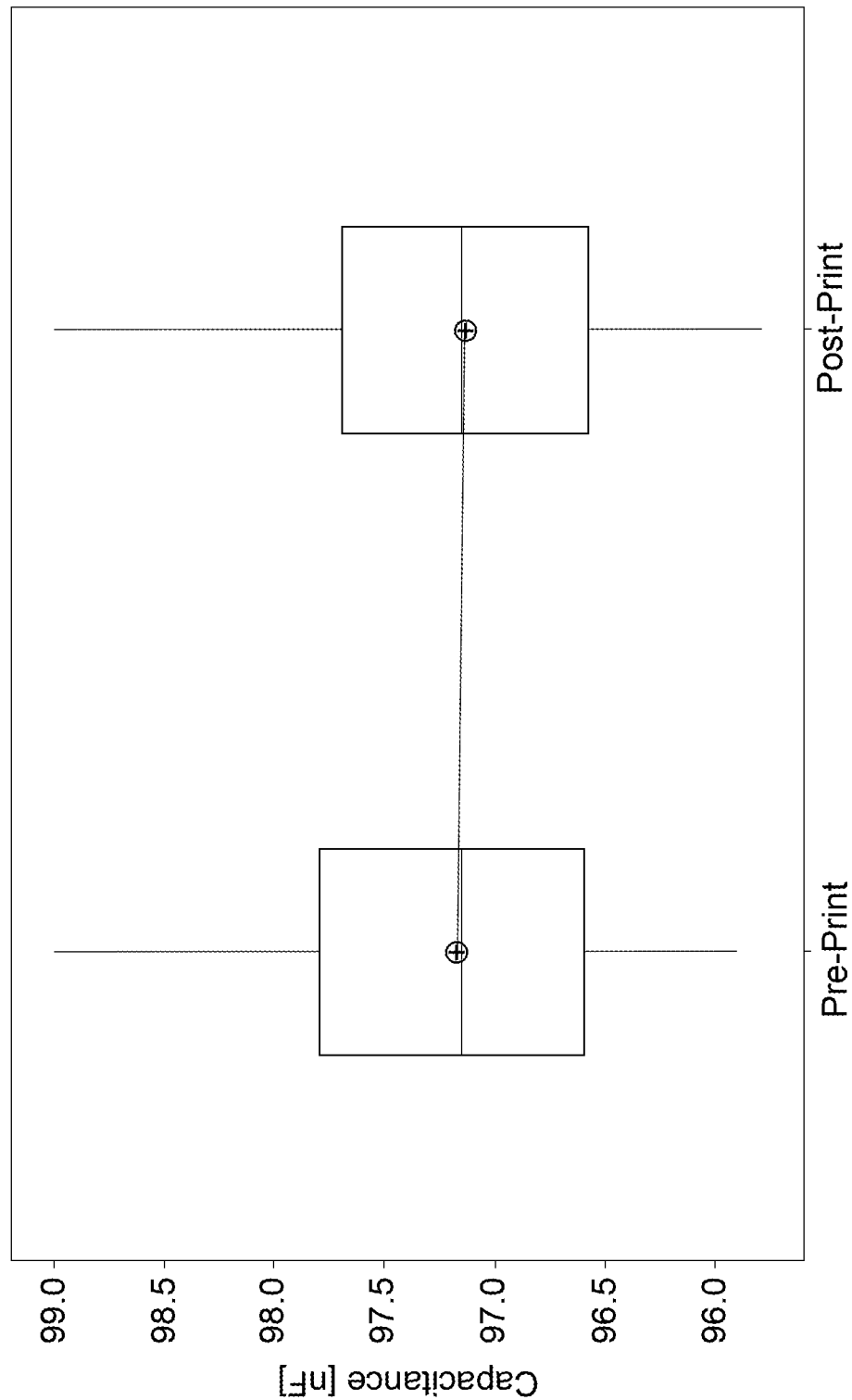
Figure 15:
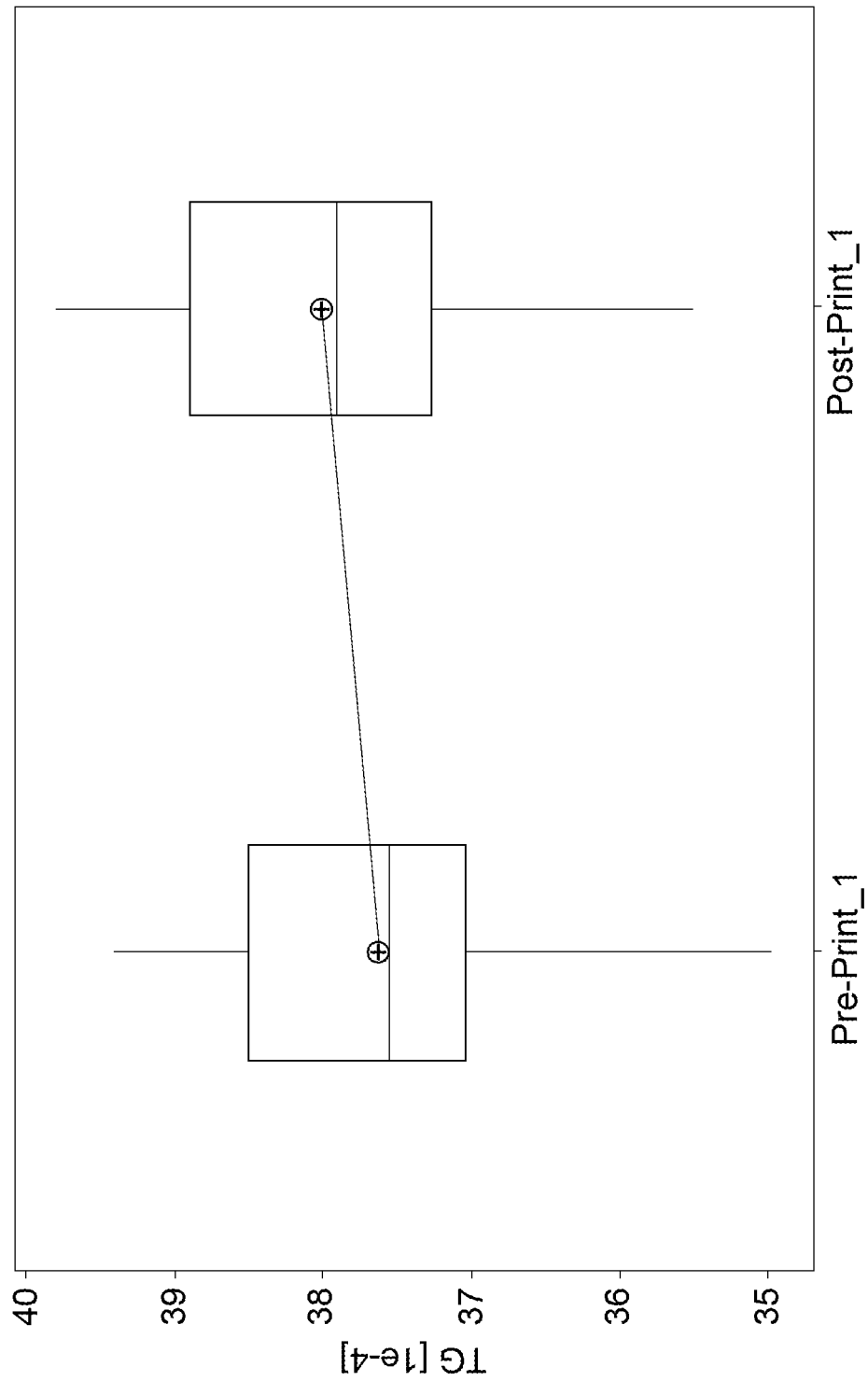
Figure 16:
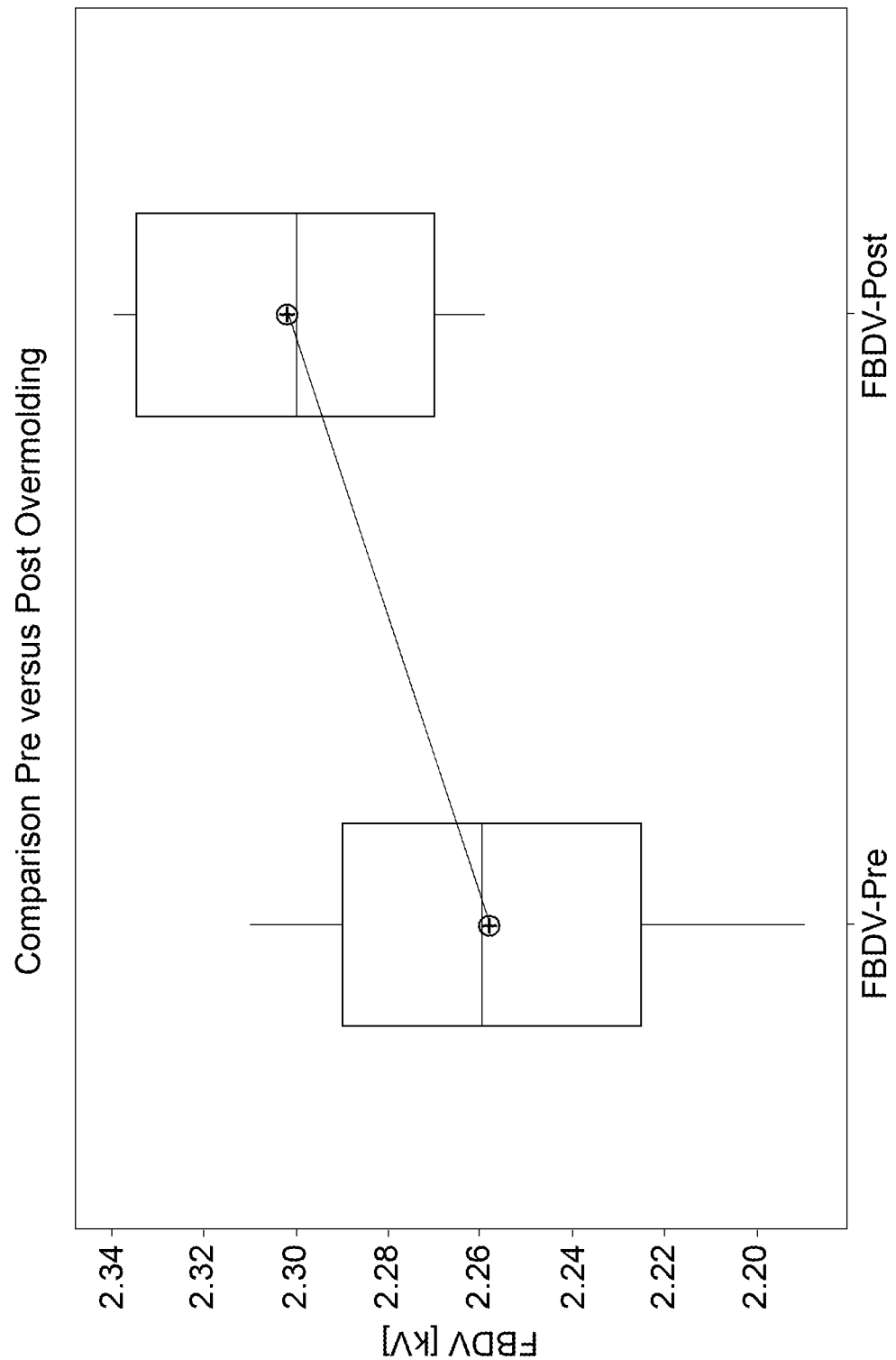

A series of identical film capacitors for electromagnetic interference (EMI) suppression applications were prepared using single metallized PP base film with aluminum and zinc and electrical connected by leads overmolded with PP resin. The film capacitors were characterized before and after the high-pressure injection overmolding. All the series was tested prior to high-pressure injection molding. A high-pressure injection molding of polypropylene was formed on the same group. The high-pressure injection molding was at a temperature of 200° C.-250° C. and a pressure of 400 bar to form a coating with a thickness of about 1 mm all around the capacitor element. All the samples were tested for breakdown voltage (FBDV) in kV with the results reported graphically in FIG. 16, capacitance in μF is reported graphically in FIG. 14 and Tgδ @ 1 kHz before and after the molding is presented graphically in FIG. 15.

Figure 17:
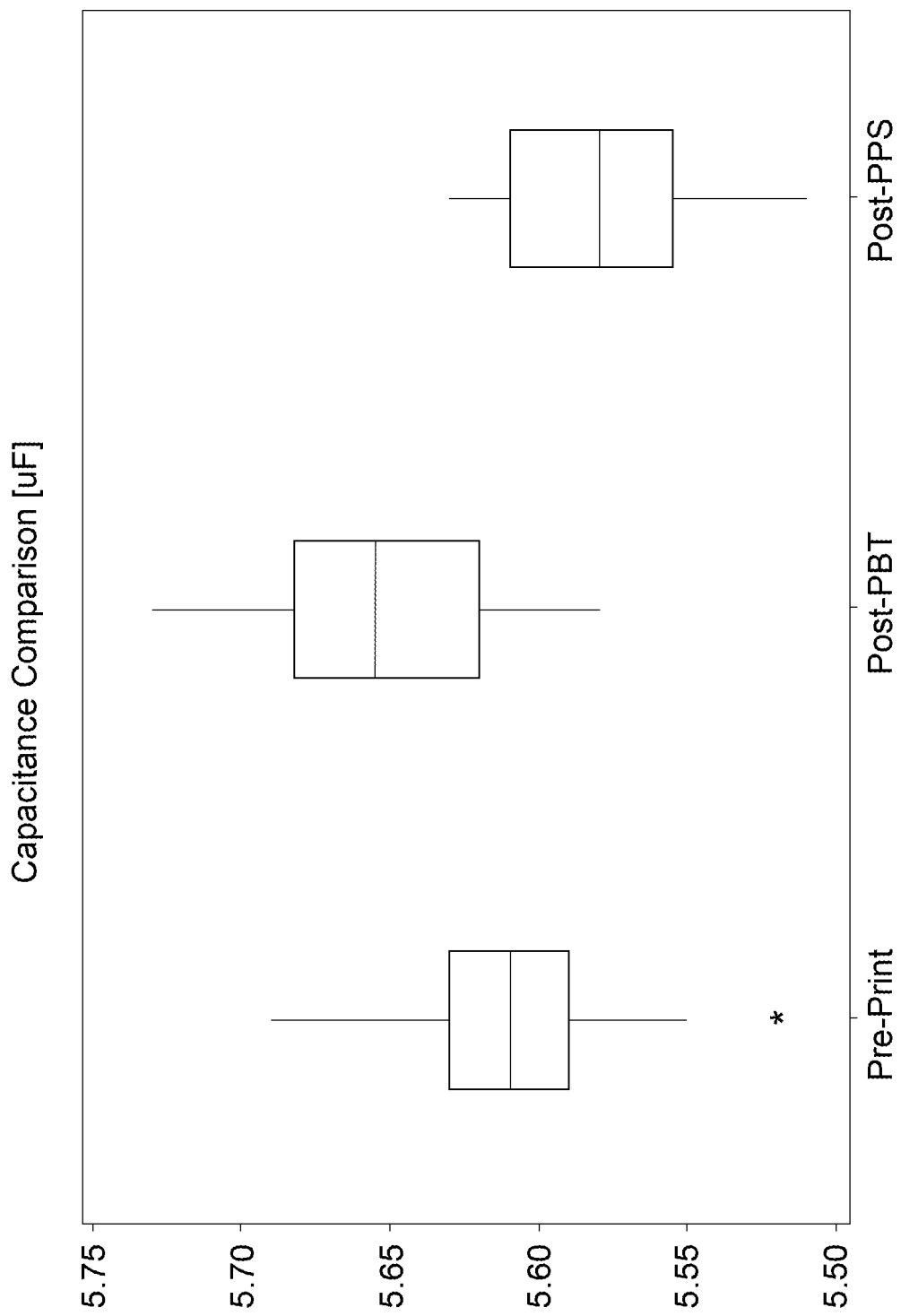
Figure 18:
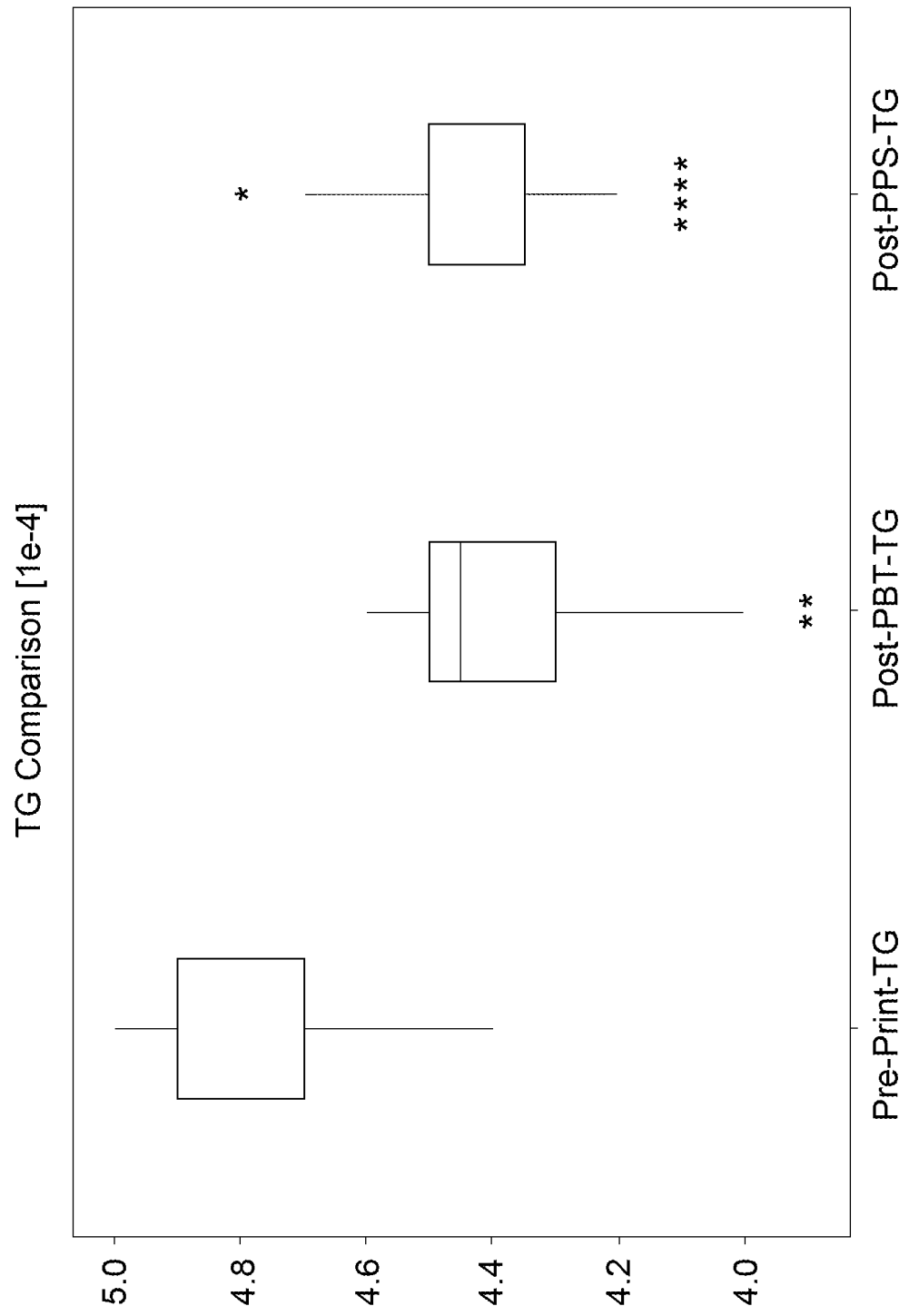
Figure 19:
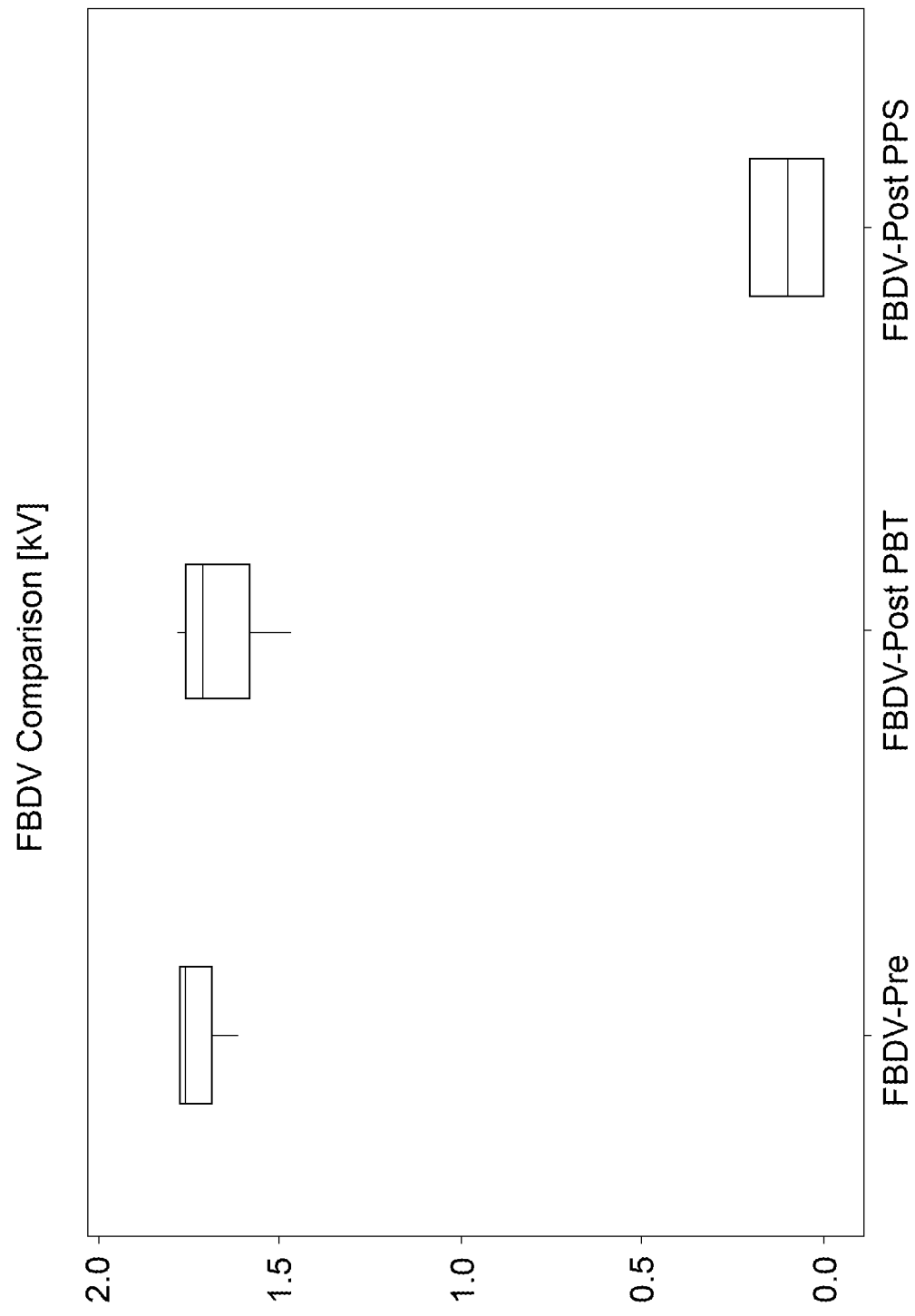
Figure 20:
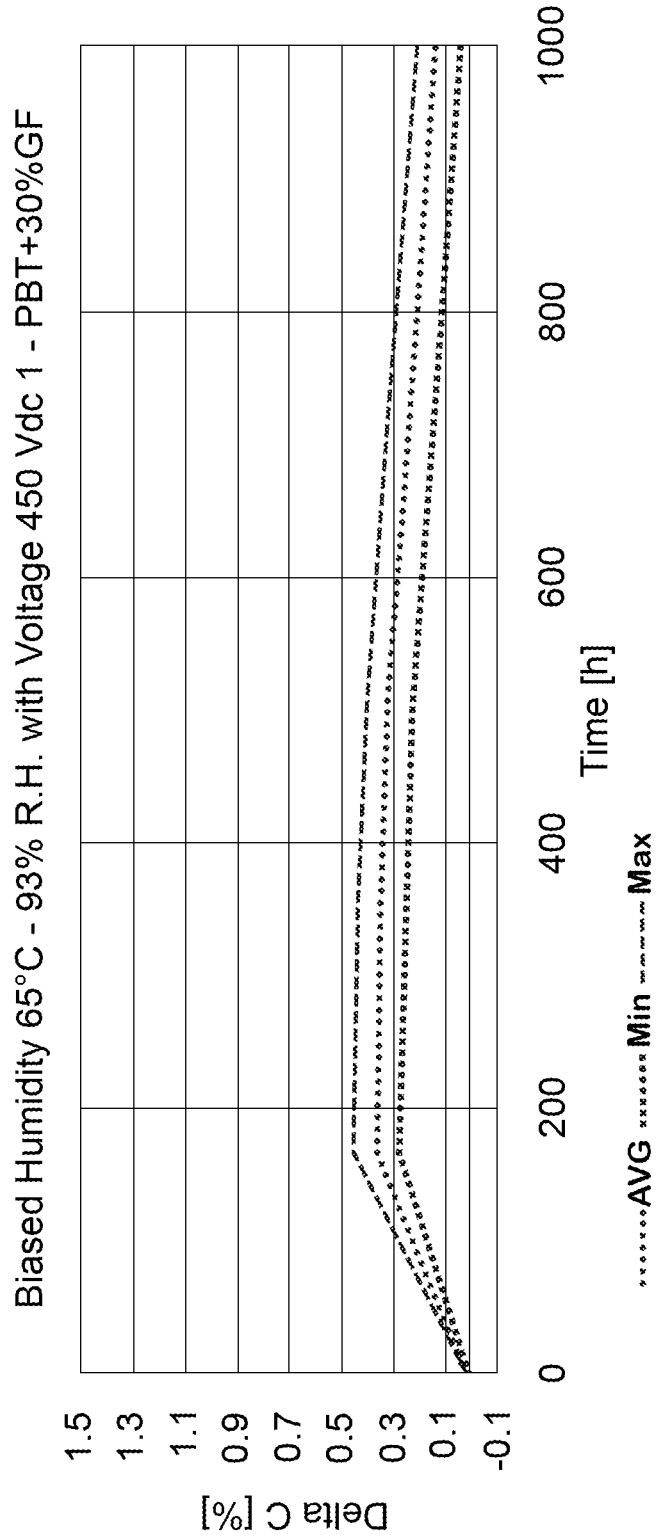
Figure 21:
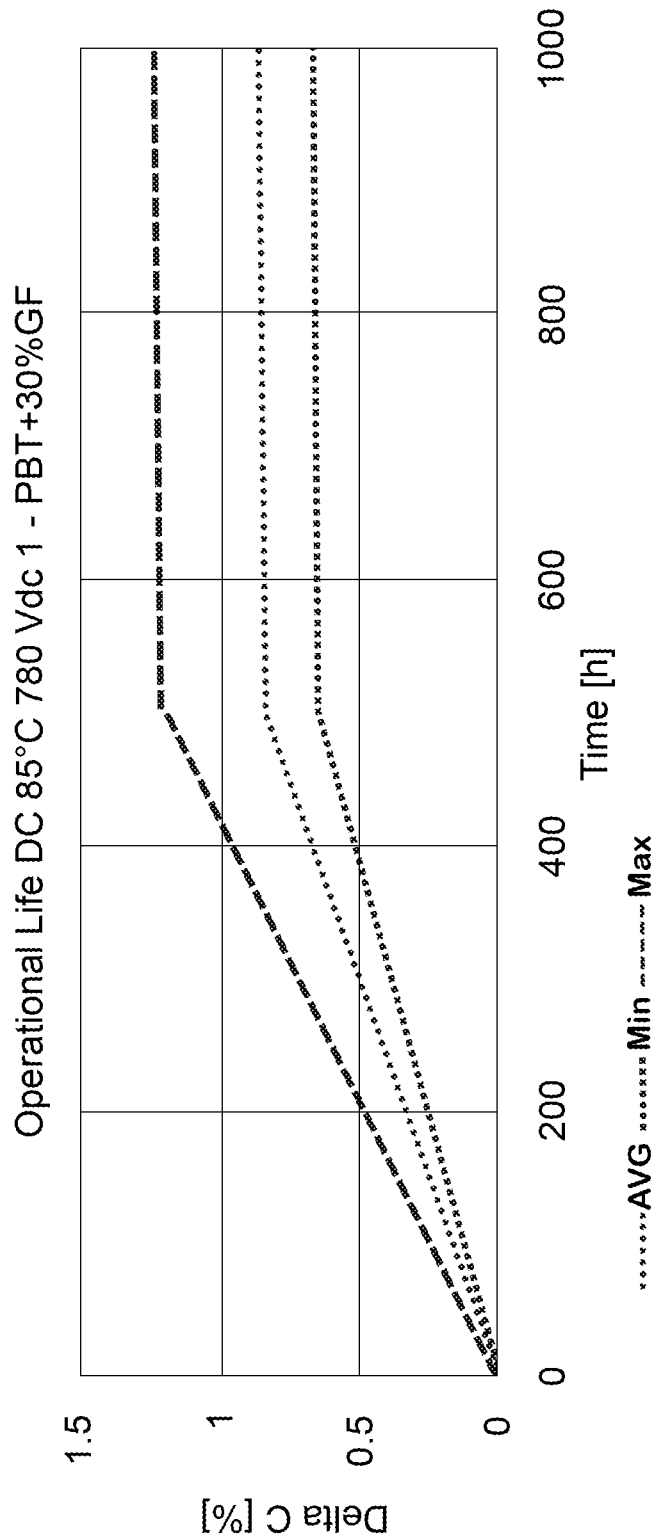
Figure 22:
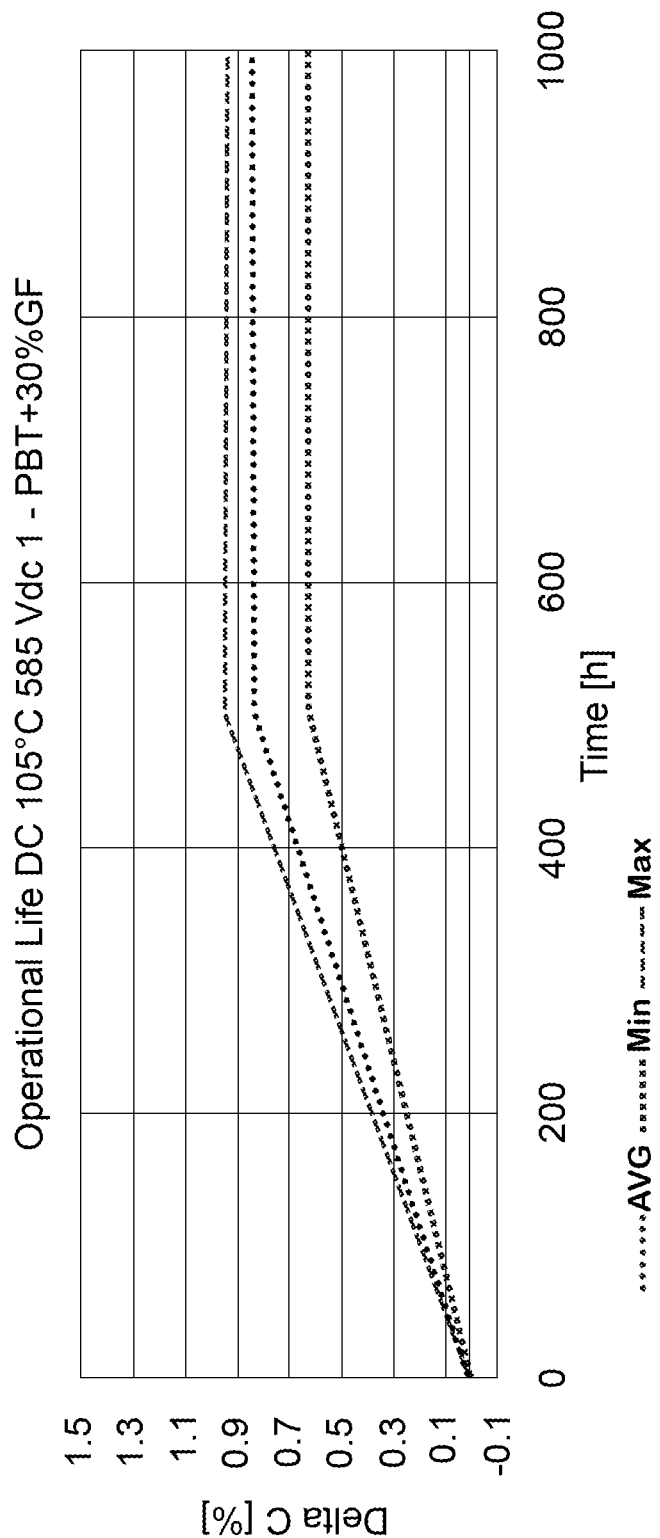

Two series of identical power box film capacitors for DC-Link applications were prepared using single metallized PP base film with aluminum and zinc which were electrical connected by leads with a pitch of 27.5 mm. One series was overmolded with a blend of PBT resin and 30% glass fiber. The second series has been overmolded with PPS. All film capacitors were characterized before and after the high-pressure injection overmoding. The high-pressure injection molding was done at 250°–300° C. for PBT and 300-360° C. for PPS at a pressure lower than 1500 bar to form a coating with a thickness of about 1 mm all around the capacitor element. The first group and second group were tested for breakdown voltage (FBDV) in kV as reported graphically in FIG. 19, capacitance in μF reported graphically in FIG. 17 and Tgδ @ 1 kHz reported graphically in FIG. 18 before and after the HPI molding. After the characterization the first series, PBT and glass fiber molded, were divided into 3 groups. One group was tested under biased humidity at 65° C.-93% RH with voltage 450 Vdc with the results presented graphically in FIG. 20, one group was tested for operational life at 85° C. @ 780 Vdc with the results presented graphically in FIG. 21 and the third group was tested at 105° C. @ 585 Vdc with the results presented graphically in FIG. 22.

A DC Link was prepared with metallized polypropylene film consist with C4AQ-P capacitors which are commercially available. Standard C4AQ-P capacitors are typically available in a rectangular plastic box with resin. The same capacitive couple was overmolded with PBT at a temperature of 270-300° C. and a pressure of 300-600 bar. The capacitance drop of the overmolded sample was within commercial limits and the DF was very good relative to standard C4AQ-P.

U.S. Pat. No. 9,127,153 and PCT Application WO 2000070569 are incorporated herein by reference.

The invention has been described with reference to preferred embodiments without limit thereto. One of skill in the art would realize additional embodiments which are described and set forth in the claims appended hereto.

The invention claimed is:

1. A method for forming an overmolded film capacitor comprising:
    forming a working element comprising a first film layer with a first conductive layer on said first film layer and a second film layer with a second conductive layer on said second film layer wherein said first conductive layer and said second conductive layer form a capacitive couple;
    forming a first lead in electrical contact with said first conductive layer and a second lead in electrical contact with said second conductive layer;
    forming an inner overmold encasing said working element; and
    forming an overmold directly on and encasing said inner overmold wherein said inner overmold comprises a thermoplastic resin with a Tg of no more than 20° C. and wherein said first lead and said second lead extend from said overmolding.

2. The method for forming an overmolded film capacitor of claim 1 wherein said forming of said outer overmold comprises high pressure molding at a pressure of 300-2200 bar.

3. The method for forming an overmolded film capacitor of claim 2 wherein said forming of said outer overmold is at a temperature of at least 245° C.

4. The method for forming an overmolded film capacitor of claim 3 wherein said forming of said outer overmold is at a temperature of no more than 360° C.

5. The method for forming an overmolded film capacitor of claim 1 wherein said thermoplastic resin has a Young's Modulus of 0.1-5 GPa.

6. The method for forming an overmolded film capacitor of claim 1 wherein said thermoplastic resin has a melting temperature of 160° C.-350° C.

7. The method for forming an overmolded film capacitor of claim 1 wherein at least one of said first film or said second film comprises a material selected from the group consisting of polypropylene, polyethylene, polyethylene terephthalate, polyphenylene sulfide, tetrafluoroethylene, polystyrene, polycarbonate, cyclic olefin copolymer, and cyclo olefin polymer.

8. The method for forming an overmolded film capacitor of claim 7 wherein said first film comprises polypropylene.

9. The method for forming an overmolded film capacitor of claim 1 wherein said outer overmold include those materials selected from the group consisting of polypropylene, polybutylene, polybutylene terephthalate, polyethylene terephthalate, poly-cyclic olefins, polyphenylene sulfide, acrylic acids, acrylonitrile butadiene styrene, Nylon®, polylactide, Liquid Crystal Polymers, polybenzimidazole, polycarbonate, polyether sulfone, polyoxymethylene, polyether ether ketone, polyethylene, polyetherimide, polyphenylene oxide, polystyrene, polyvinyl chloride, polyvinylidene and polytetrafluoroethylene and bio-based polymers.

10. The method for forming an overmolded film capacitor of claim 1 wherein at least one of said inner overmold or said outer overmold further comprisings a phase change material.

11. The method for forming an overmolded film capacitor of claim 10 wherein said inner overmold comprises said phase change material.

12. The method for forming an overmolded film capacitor of claim 11 wherein said phase change material is selected from the group consisting of alloys, organic phase change materials, water-based phase change materials, waxes, hydrated salt-based materials, solid-solid phase change materials, sugar alcohol based materials and solid-viscous-liquid phase change materials.

13. The method for forming an overmolded film capacitor of claim 12 wherein said phase change material is selected from the group consisting of InSn solder, InAg solder, InPb solder, BiSn solder, savE® HS89, PureTemp® 151, Paraffin 33-Carbon, PlusICE A118, and PlusICE A164, bees wax, carnauba wax, paraffin wax, PlusICE H120, magnesium chloride hexahydrate, PlusICE S117, PlusICE X130, tris(hydroxymethyl)aminomethane, FSM-PCM95 and 9005-H120.

14. The method for forming an overmolded film capacitor of claim 10 wherein said phase change material has an enthalpy for phase change range from 0.1 kJ/kg to 4186 kJ/kg.

15. The method for forming an overmolded film capacitor of claim 10 wherein said phase change material has an enthalpy for phase change range from 50 kJ/kg to 600 kJ/kg.

16. The method for forming an overmolded film capacitor of claim 10 wherein said phase change material has an phase change temperature of 45° C. to 300° C.

17. The method for forming an overmolded film capacitor of claim 16 wherein said phase change material has an phase change temperature of 80° C. to 200° C.

18. The method for forming an overmolded film capacitor of claim 10 wherein said overmold comprises at least 1 wt % said phase change material.

19. A method for forming an overmolded film capacitor comprising:
forming a working element comprising a first film layer with a first conductive layer on said first film layer and a second film layer with a second conductive layer on said second film layer wherein said first conductive layer and said second conductive layer form a capacitive couple;
forming a first lead in electrical contact with said first conductive layer and a second lead in electrical contact with said second conductive layer;
forming an inner overmold encasing said working element; and
forming an overmold directly on and encasing said inner overmold wherein said overmold on said working element wherein said overmold comprises a thermoplastic resin with a Youngs Modulus of 0.1-5 GPa and wherein said first lead and said second lead extend from said overmolding, and
wherein said overmold comprises an inner overmold encasing said working element and an outer overmold encasing said inner mold.

20. The method for forming an overmolded film capacitor of claim 19 wherein said thermoplastic resin has a Tg of no more than 20° C.

21. The method for forming an overmolded film capacitor of claim 19 wherein said forming of said outer overmold comprises high pressure molding at a pressure of 300-2200 bar.

22. The method for forming an overmolded film capacitor of claim 21 wherein said forming of said outer overmold is at a temperature of at least 245° C.

23. The method for forming an overmolded film capacitor of claim 22 wherein said forming of said outer overmold is at a temperature of no more than 360° C.

24. The method for forming an overmolded film capacitor of claim 19 wherein said thermoplastic resin has a melting temperature of 160° C.-350° C.

25. The method for forming an overmolded film capacitor of claim 19 wherein at least one of said first film or said second film comprises a material selected from the group consisting of polypropylene, polyethylene, polyethylene terephthalate, polyphenylene sulfide, tetrafluoroethylene, polystyrene, polycarbonate, cyclic olefin copolymer, and cyclo olefin polymer.

26. The method for forming an overmolded film capacitor of claim 25 wherein said first film comprises polypropylene.

27. The method for forming an overmolded film capacitor of claim 19 wherein said outer overmold include those materials selected from the group consisting of polypropylene, polybutylene, polybutylene terephthalate, polyethylene terephthalate, poly-cyclic olefins, polyphenylene sulfide, acrylic acids, acrylonitrile butadiene styrene, Nylon®, polylactide, Liquid Crystal Polymers, polybenzimidazole, polycarbonate, polyether sulfone, polyoxymethylene, polyether ether ketone, polyethylene, polyetherimide, polyphenylene oxide, polystyrene, polyvinyl chloride, polyvinylidene and polytetrafluoroethylene and bio-based polymers.

28. The method for forming an overmolded film capacitor of claim 19 wherein at least one of said inner overmold or said outer overmold further comprisings a phase change material.

29. The method for forming an overmolded film capacitor of claim 28 wherein said inner overmold comprises said phase change material.

30. The method for forming an overmolded film capacitor of claim 28 wherein said phase change material is selected from the group consisting of alloys, organic phase change materials, water-based phase change materials, waxes, hydrated salt-based materials, solid-solid phase change materials, sugar alcohol based materials and solid-viscous-liquid phase change materials.

31. The method for forming an overmolded film capacitor of claim 30 wherein said phase change material is selected from the group consisting of InSn solder, InAg solder, InPb solder, BiSn solder, savE® HS89, PureTemp® 151, Paraffin 33-Carbon, PlusICE A118, and PlusICE A164, bees wax, carnauba wax, paraffin wax, PlusICE H120, magnesium chloride hexahydrate, PlusICE S117, PlusICE X130, tris(hydroxymethyl)aminomethane, FSM-PCM95 and 9005-H120.

32. The method for forming an overmolded film capacitor of claim 30 wherein said phase change material has an enthalpy for phase change range from 0.1 kJ/kg to 4186 kJ/kg.

33. The method for forming an overmolded film capacitor of claim 32 wherein said phase change material has an enthalpy for phase change range from 50 kJ/kg to 600 kJ/kg.

34. The method for forming an overmolded film capacitor of claim 28 wherein said phase change material has an phase change temperature of 45° C. to 300° C.

35. The method for forming an overmolded film capacitor of claim 34 wherein said phase change material has an phase change temperature of 80° C. to 200° C.

36. The method for forming an overmolded film capacitor of claim 28 wherein said overmold comprises at least 1 wt % said phase change material.

37. A method for forming an overmolded film capacitor comprising:
forming a working element comprising first film layer with a first conductive layer on said first film layer and a second film layer with a second conductive layer on said second film layer wherein said first conductive layer and said second conductive layer form a capacitive couple;
forming a first lead in electrical contact with said first conductive layer and a second lead in electrical contact with said second conductive layer;
forming an inner overmold encasing said working element;
forming an overmold directly on and encasing said inner overmold at a pressure of 300-2200 bar and a temperature of at least 245° C. wherein said overmold comprises a thermoplastic resin; and
wherein said first lead and said second lead extend from said overmolding.

38. The method for forming an overmolded film capacitor of claim 37 wherein said inner overmold comprises a second thermoplastic resin and said second thermoplastic resin has a Tg of no more than 20° C.

39. The method for forming an overmolded film capacitor of claim 37 wherein said thermoplastic resin has a Youngs Modulus of 0.1-5 GPa.

40. The method for forming an overmolded film capacitor of claim 37 wherein said thermoplastic resin has a melting temperature of 160° C.-350° C.

41. The method for forming an overmolded film capacitor of claim 37 wherein said forming of said overmold is at a temperature of no more than 360° C.

42. The method for forming an overmolded film capacitor of claim 37 wherein at least one of said first film or said second film comprises a material selected from the group consisting of polypropylene, polyethylene, polyethylene terephthalate, polyphenylene sulfide, tetrafluoroethylene, polystyrene, polycarbonate, cyclic olefin copolymer, and cyclo olefin polymer.

43. The method for forming an overmolded film capacitor of claim 42 wherein said first film comprises polypropylene.

44. The method for forming an overmolded film capacitor of claim 37 wherein said outer overmold include those materials selected from the group consisting of polypropylene, polybutylene, polybutylene terephthalate, polyethylene terephthalate, poly-cyclic olefins, polyphenylene sulfide, acrylic acids, acrylonitrile butadiene styrene, Nylon®, polylactide, Liquid Crystal Polymers, polybenzimidazole, polycarbonate, polyether sulfone, polyoxymethylene, polyether ether ketone, polyethylene, polyetherimide, polyphenylene oxide, polystyrene, polyvinyl chloride, polyvinylidene and polytetrafluoroethylene and bio-based polymers.

45. The method for forming an overmolded film capacitor of claim 37 wherein at least one of said inner overmold or said outer overmold further comprisings a phase change material.

46. The method for forming an overmolded film capacitor of claim 45 wherein said inner overmold comprises said phase change material.

47. The method for forming an overmolded film capacitor of claim 46 wherein said phase change material is selected from the group consisting of alloys, organic phase change materials, water-based phase change materials, waxes, hydrated salt-based materials, solid-solid phase change materials, sugar alcohol based materials and solid-viscous-liquid phase change materials.

48. The method for forming an overmolded film capacitor of claim 47 wherein said phase change material is selected from the group consisting of InSn solder, InAg solder, InPb solder, BiSn solder, savE® HS89, PureTemp® 151, Paraffin 33-Carbon, PlusICE A118, and PlusICE A164, bees wax, carnauba wax, paraffin wax, PlusICE H120, magnesium chloride hexahydrate, PlusICE S117, PlusICE X130, tris (hydroxymethyl)aminomethane, FSM-PCM95 and 9005-H120.

49. The method for forming an overmolded film capacitor of claim 45 wherein said phase change material has an enthalpy for phase change range from 0.1 kJ/kg to 4186 kJ/kg.

50. The method for forming an overmolded film capacitor of claim 49 wherein said phase change material has an enthalpy for phase change range from 50 kJ/kg to 600 kJ/kg.

51. The method for forming an overmolded film capacitor of claim 45 wherein said phase change material has an phase change temperature of 45° C. to 300° C.

52. The method for forming an overmolded film capacitor of claim 51 wherein said phase change material has an phase change temperature of 80° C. to 200° C.

53. The method for forming an overmolded film capacitor of claim 45 wherein said overmold comprises at least 1 wt % said phase change material.

54. An overmolded film capacitor comprising:
at least one working element comprising a dielectric film with a conductor formed on said dielectric film;
an inner overmold encasing said working element;
an overmold encasing said said inner overmold wherein said overmold comprises a thermoplastic resin directly on said inner overmold and said overmold does not comprise a resin filled box.

55. The overmolded film capacitor of claim 54 wherein said thermoplastic resin has a melting temperature of 160° C.-350° C.

56. The overmolded film capacitor of claim 54 wherein said thermoplastic resin has a Youngs Modulus of 0.1-5 GPa.

57. The overmolded film capacitor of claim 54 wherein said inner overmold comprises a second thermoplastic resin and said second thermoplastic resin has a Tg of no more than 20° C.

58. The overmolded film capacitor of claim 54 comprising at least one first film or a second film wherein at least one of said first film or said second film comprises a material selected from the group consisting of polypropylene, polyethylene, polyethylene terephthalate, polyphenylene sulfide, tetrafluoroethylene, polystyrene, polycarbonate, cyclic olefin copolymer, and cyclo olefin polymer.

59. The overmolded film capacitor of claim 58 wherein said first film comprises polypropylene.

60. The overmolded film capacitor of claim 54 wherein said outer overmold include those materials selected from the group consisting of polypropylene, polybutylene, polybutylene terephthalate, polyethylene terephthalate, poly-cyclic olefins, polyphenylene sulfide, acrylic acids, acrylonitrile butadiene styrene, Nylon®, polylactide, Liquid Crystal Polymers, polybenzimidazole, polycarbonate, polyether sulfone, polyoxymethylene, polyether ether ketone, polyethylene, polyetherimide, polyphenylene oxide, polystyrene, polyvinyl chloride, polyvinylidene and polytetrafluoroethylene and bio-based polymers.

61. The overmolded film capacitor of claim 54 wherein at least one of said inner overmold or said outer overmold further comprisings a phase change material.

62. The overmolded film capacitor of claim 61 wherein said outer inner overmold comprises said phase change material.

63. The overmolded film capacitor of claim 61 wherein said phase change material is selected from the group consisting of alloys, organic phase change materials, water-based phase change materials, waxes, hydrated salt-based materials, solid-solid phase change materials, sugar alcohol based materials and solid-viscous-liquid phase change materials.

64. The overmolded film capacitor of claim 63 wherein said phase change material is selected from the group consisting of InSn solder, InAg solder, InPb solder, BiSn solder, savE® HS89, PureTemp® 151, Paraffin 33-Carbon, PlusICE A118, and PlusICE A164, bees wax, carnauba wax, paraffin wax, PlusICE H120, magnesium chloride hexahydrate, PlusICE S117, PlusICE X130, tris(hydroxymethyl) aminomethane, FSM-PCM95 and 9005-H120.

65. The overmolded film capacitor of claim 61 wherein said phase change material has an enthalpy for phase change range from 0.1 kJ/kg to 4186 kJ/kg.

66. The overmolded film capacitor of claim 61 wherein said phase change material has an enthalpy for phase change range from 50 kJ/kg to 600 kJ/kg.

67. The overmolded film capacitor of claim 61 wherein said phase change material has an phase change temperature of 45° C. to 300° C.

68. The overmolded film capacitor of claim 67 wherein said phase change material has an phase change temperature of 80° C. to 200° C.

69. The overmolded film capacitor of claim 61 wherein said overmold comprises at least 1 wt % said phase change material.

\* \* \* \* \*

UNITED STATES PATENT AND TRADEMARK OFFICE
CERTIFICATE OF CORRECTION

PATENT NO. : 11,935,699 B2
APPLICATION NO. : 17/709547
DATED : March 19, 2024
INVENTOR(S) : Evangelista Boni et al.

It is certified that error appears in the above-identified patent and that said Letters Patent is hereby corrected as shown below:

On the Title Page

Item (72) last three inventors' city should be listed as:
Federico Fantini, Sasso Marconi (IT)
Gabriele Piccinini, Sasso Marconi (IT)
Walter Bruno, Sasso Marconi (IT)

Signed and Sealed this
Thirtieth Day of April, 2024

Katherine Kelly Vidal
*Director of the United States Patent and Trademark Office*